United States Patent [19]
Frisken Gibson

[11] Patent Number: 5,548,694
[45] Date of Patent: Aug. 20, 1996

[54] COLLISION AVOIDANCE SYSTEM FOR VOXEL-BASED OBJECT REPRESENTATION

[75] Inventor: Sarah F. Frisken Gibson, Arlington, Mass.

[73] Assignee: Mitsubishi Electric Information Technology Center America, Inc., Cambridge, Mass.

[21] Appl. No.: 381,108

[22] Filed: Jan. 31, 1995

[51] Int. Cl.$^6$ .................................................. G06F 15/00
[52] U.S. Cl. ........................ 395/124; 395/127; 364/461
[58] Field of Search ............................. 395/124, 127, 395/152; 364/461

[56] References Cited

U.S. PATENT DOCUMENTS

| | | | |
|---|---|---|---|
| 5,091,861 | 2/1992 | Geller et al. | 364/474.34 |
| 5,187,660 | 2/1993 | Civanlar et al. | 364/413.19 |
| 5,347,459 | 9/1994 | Greenspan et al. | 364/461 |
| 5,442,733 | 8/1995 | Kaufman et al. | 395/124 |
| 5,458,125 | 10/1995 | Schweikard | 128/653.1 |

Primary Examiner—Heather R. Herndon
Assistant Examiner—Cliff N. Vo
Attorney, Agent, or Firm—Robert K. Tendler, Esq.

[57] ABSTRACT

Voxel-based objects are manipulated and interacted with in a physically realistic way such that during movement of the graphical objects, collisions are automatically detected and the graphical objects are prevented from penetrating each other. Applications include computer graphics and animation, CAD/CAM, and virtual reality applications that require real-time interaction between complex three-dimensional object models. When objects are represented in a voxel-based format where objects consist of clusters of regularly or irregularly spaced sampled data points, rather than a conventional graphic format where objects are represented by lists of polygons, primitive surfaces, or geometries, moving objects in virtual space involves shifting the voxel-based data in a large memory array representing the virtual space of the system and detecting collisions among moving objects by checking the new memory locations of object voxels to see if they are already occupied.

2 Claims, 12 Drawing Sheets

COLLISION AVOIDANCE SYSTEM FOR VOXEL-BASED OBJECT REPRESENTATION

FIELD OF INVENTION

This invention relates to a system for permitting movement and interaction between graphical objects in a virtual space and more particularly to the detection of collisions among two-dimensional and three-dimensional graphical objects that are represented in a voxel-based format.

BACKGROUND OF THE INVENTION

There are several challenging applications in computer graphics and virtual reality that require real-time interaction between three-dimensional object models. For example, in an interactive virtual assembly task in which graphical objects are to be moved around in a virtual environment and viewed on a computer screen, the operator uses an input tracker device to select and manipulate various object models in the virtual work space until they fit together to make a composite structure. The object models must act in a physically realistic way in order to provide a sense of realism to the user. For example, two different solid object models should not be allowed to penetrate each other as they are moved.

As a second example, in a physically realistic simulation or animation, object models must react to each other when they come in contact. Object models should be prevented from penetrating each other and the entire system should obey physical laws to conserve momentum anti energy.

Both of these problems require the detection of collisions and contacts between the moving object models. In interactive systems, contacts and collisions must be calculated quickly so that the application can run in real-time. Unfortunately, collision detection is a very computationally intensive task for most conventional object formats.

In very simple applications and computer games, an object's position is indicated by a single point in space. A collision between two objects is detected if the distance between the two object points is less than the average size of the two objects. A collision between an object and a boundary of the environment is detected if the object point position violates some constraint. For example, the object collides with the floor of the environment if its height is negative. This method is simple and fast but can not be used to model the interactions between objects that have complex shapes or intricate surfaces.

In some dynamics simulations, collisions are avoided by building motion constraints into the system dynamics. For example, a limb of a human model might be prevented from intersecting the body segment by building joint angle limits into the system model. The same limb might be prevented from intersecting the floor by checking to see if a single point on the end of the lima has a negative height. Although these methods can be useful for dynamic simulations, they require a full knowledge of the geometry and the desired motion when the dynamic system model is created. This method becomes intractable for arbitrarily shaped objects in complex environments.

In conventional graphical formats, objects are modeled as lists of polygons or primitive surfaces, as lists of primitive solid geometries, or as some combination of these. In this format, each list element is essentially a set of mathematical equations or conditions. For example, a single three-sided polygon in a polygonal representation consists of an ordered list of three polygon vertices. The surface represented by the polygon is defined by the intersection of the three half planes that are defined by the three point-line combinations of the polygon vertices. In order to detect a possible collision between two objects, primitive elements in the list of the first object must be checked for intersection with every primitive element in the list of the second object. This amounts to solving for an intersection between two sets of mathematical equations and conditions for each possible combination of list elements.

When objects are reasonably complex, each object may contain tens of thousands or hundreds of thousands of elements. Hence many millions of equations must be solved each time an object is moved to determine if there has been a collision. Although algorithms have been introduced that reduce the number of element pairs that must be checked for intersection, the detection of collisions between complex objects remains one of the major time bottlenecks in computer applications that attempt to perform physically realistic modeling or simulation.

More particularly, in tasks involving interactive manipulation of two-dimensional and three-dimensional graphical objects, the speed of the application and hence the degree of interactivity is limited by the computations required for physically based modeling and visualization of the three-dimensional environment. Advances in graphics rendering hardware have greatly enhanced rendering speeds for visualization of conventional graphical objects. However, computations required to detect collisions between objects and to calculate reaction forces and motion resulting from these collisions, severely limit the number and complexity of objects that can be represented in an interactive graphics application. As objects become more complex, the amount of computation required to detect collisions can increase exponentially. Algorithms which partition the object space or use bounding boxes or special data structures can reduce the number of computations required. However, when objects move freely through the virtual space, when the objects consist of complex or intricate shapes, or when objects are in close contact, these algorithms are less effective.

Hence, collision detection can place severe restrictions on interactive computer graphics applications and there is a need for better ways to perform real-time collision detection among freely moving, complex objects.

By way of further background, new imaging and data sampling technologies have resulted in large, multi-dimensional arrays of data. This volumetric, or voxel-based data typically contains hundreds of thousand or millions of data points. The need to visualize and explore data in this format has led to the development of the field of volume visualization. For example, medical imaging technologies such as magnetic resonance imaging, MRI, or computed tomography, CT, can produce a three-dimensional image of interior structures in a living patient. These three-dimensional images contain detailed information about tissue density or composition that can be used to locate tumors, bone fractures, and a multitude of other pathologies. Other sources of multi-dimensional sampled data include seismic images, temperature, weather and pressure measurements made by weather balloons, and multi-dimensional data produced in simulations of fluid flow or molecular modeling.

One of the problems presented by these large data volumes is the problem of how to visualize the multi-dimensional data in a two-dimensional image or on a two-dimensional computer screen. For three-dimensional, or volumetric data, there are three basic ways to present the data.

The first method is to present the user with a set of two-dimensional cross-sections through the three-dimensional data. The user must mentally reconstruct the three-dimensional image in order to visualize structures of interest. This is still the method of choice in most radiology labs where MRI or CT images are presented to the surgeon or radiologist as a sequence of two-dimensional images. However, if the images reveal a complex three-dimensional structure such as a compound fracture, it can be very difficult to visualize the extent of the fracture using this method.

The second presentation method converts the volumetric data into a conventional graphical model that can be manipulated using a conventional graphics application. In order to generate the model, surface points on the features of interest are detected and used to create a list of polygons or primitive surfaces that describe the surface of the structure of interest. This method has been particularly useful in orthopedics applications since bone surfaces are easily separated from the surrounding tissue in CT images and since graphical representations of bones and fractures can be used to for making measurements for the sizing of implants or orthotic devices. However, this method is limited because, in creating the graphical object, assumptions must be made about where the surface lies. This can introduce errors into the object model that can greatly effect the accuracy of the image. For example, by changing the sensitivity of the surface detection algorithm when creating the surface, bone fractures can either be exaggerated or over-looked in the graphical representation. In addition, all of the data except for those points on the surface are discarded. It essentially transforms the rich, volumetric image data into a set of surface shells around structures of interest.

Volume rendering is the third method for visualizing volumetric data. It was introduced in the 1970's and has gained in popularity since the late 1980's. See for example, A. Kaufman, "Volume Visualization", IEEE Comp. Society Press, 1991. In this method, each point in the data volume is assigned a color and transparency. A two dimensional view through the image is formed by accumulating the effects of the individual volume elements on light rays passing through the entire data volume. If objects are transparent, then interior structures will be visible in the two-dimensional view through the data. By adjusting colors and transparencies, different structures and features in the data can be made more or less visible.

Volume rendering has proved to be a powerful tool for visualizing the types of volumetric data described above. However, it has also proved to be useful for a number of other graphics applications. For example, a volume rendering approach can be used to produce realistic images of amorphous substances such as smoke, fog, or water flowing over a waterfall. In the early 1990s, the idea of representing conventional graphical objects such as a table and chair, a glass, or a reflecting sphere was introduced. For an overview, see A. Kaufman, D. Cohen, and R. Yagel, "Volume Graphics", Computer, July, 1993, pp. 51–64. This representation of conventional graphical objects in a volumetric format has been dubbed volume graphics.

More particularly, in a voxel-based object model representation, objects are represented as two-dimensional or three-dimensional arrays of regularly or irregularly sampled volume elements rather than as lists of polygons, or primitive surfaces, or geometries. These volume elements, also called voxels, typically contain information about the color and transparency of the object at that point. However, other information, such as an object-type identifier, material properties, the surface normal at the sampled point and information about connections to neighboring points, can also be encoded into each voxel. Until recently, rendering a volume of a reasonable size required several minutes on a high-end workstation. However, due to the nature of voxel-based data, volume rendering algorithms are highly parallelizable. Faster algorithms and special-purpose hardware for volume rendering are enabling real-time volume rendering of data of significant size and resolution. Hence, although the memory requirements in volume graphics can be much larger than the memory requirements for conventional graphical objects, as memory becomes cheaper and as volume rendering algorithms and hardware are improved, the richness and regularity of a volumetric data representation makes volume graphics more attractive for graphics applications.

Using volume graphics, conventional graphical objects can be represented in a voxel-based format. One important problem that remains is how to manipulate voxel-based objects so that they interact in a physically realistic way. For example, in a volumetric medical image, it is useful to be able to manipulate individual bone structures represented in a voxel-based format in the same way that they can be manipulated when they are converted into a conventional graphics format. For example, a surgeon could rotate a bone model in its socket joint and detect movement constraints when the bone model contacts the sides of the joint or the surgeon could test the insertion of an implant along a planned cutting path through a voxel-based bone model in a surgical simulation.

Hence, there is a need for a system or machine that defines how objects represented in a voxel-based format interact with each other and their environment so that volume graphics can be extended from its current embodiment of visualization of voxel-based graphical objects to include manipulation of voxel-based objects in a physically realistic way. In particular, the need for ways to model physically realistic interactions between voxel-based objects requires the detection of collisions between complex objects in real-time applications.

Some systems that have been developed for pre-surgical planning in particular, manipulate voxel-based models representing objects and surgical cutting shapes. Among these, some systems can detect intersections between different objects or the intersection of an object and a cutting shape. In one, by L. Chen and M. Sontag, "Representation, Display, and Manipulation of 3D digital scenes and their Medical Applications", Computer Vision, Graphics, and Image Processing, 48, 1989, pp. 190–216, a user-defined clipping volume is intersected with an object to simulate surgical removal of the clipping volume. However, the octree based object representation is different from the voxel array based representation of volume graphics and the system does not use intersections to control or limit object movement.

Similarly, in a second system by S. Arridge, "Manipulation of Volume data for Surgical Simulation", in "3D Imaging in Medicine", eds. K. Hohne et al, Springer-Verlag, 1990, object volumes are stored in an octree representation rather than a voxel based representation. The overlaps between objects are detected by Boolean operations on the octrees of different objects. In addition, the overlaps are not used to control or limit object movement.

In a third system by Yasuda et al, "Computer System for Craniofacial Surgical Planning based on CT Images", IEEE Trans. on Med. Imaging, 9, 1990, pp. 270–280, the data is stored in a voxel based format in a sequence of 2D image planes. However, the cutting volume is defined by a polygonal shape plus a depth. The detection of overlap between the object and the cutting volume is not made on a voxel-by-voxel basis but instead the cutting volume is removed in each data plane by scan converting the polygon to determine data points that lie inside the cutting volume.

In a fourth system by J. Gerber et al., "Simulating Femoral Repositioning with Three-dimensional CT", J. Computer Assisted Tomography, 15, 1991, pp. 121–125, individual voxel-based objects are represented and moved. A combined volume containing all of the objects is recreated for volume rendering after movement has been completed. The system described in this paper does not consider using overlapping regions to control object placement or movement.

There are two related systems for detecting collisions and interference from conventional graphics models. In the first by J. Rossignac et al., "Interactive Inspections of Solids: Cross-sections and Interference", Computer Graphics, 26, 1992, pp. 353–360, intersection between objects in a 2D cross-section through a solid model is found by scan converting the 2D cross-sections into screen pixels and looking for overlap between the pixel maps of different objects. Unlike a voxel based object model, this interference detection method requires data conversion from a solid geometry model to a 2D pixel representation for each cross-section of interest.

In the second system by A. Garcia-Alonso et al., "Solving the Collision Detection Problem", IEEE Computer Graphics and Animation, May, 1994, pp. 36–43, the system includes a "voxel" based method to limit the search space for collision detection between surface facets of their polygonal object models. However, the "voxel" described in this system is a spatial subdivision of the object into approximately 8×8×8 collections of surface facets and hence is very different from the sampled data voxel of volume graphics.

In summary, the detection of collisions between graphical objects is an important and challenging problem in computer graphics, computer animation, and virtual reality. Conventional graphics representations using polygons, surface primitives or primitive solid geometries have two major limitations. First, they are not suitable for representing certain types of data such as medical images, and second, collision detection between arbitrary graphical objects is inherently mathematically intense. On the other hand, a voxel based data representation provides a simple yet powerful means to represent both interior and surface data structures. While a few systems exist that can be used to determine the overlap between a cutting volume and a voxel-based object or between two polygonal models using overlapping pixels in a cross-section plane, these systems do not use a voxel-by-voxel comparison between voxel based object representations to determine collisions or intersections. Moreover, in most cases, the data structures used are different from the simple voxel array structure of volume graphics. In addition, these systems do not use information about overlap or intersections between objects to limit or control object movement. Finally, these systems perform calculations of overlap or intersections on static configurations of the graphical objects and there is no attempt to perform or display real-time collision detection of moving objects.

SUMMARY OF THE INVENTION

The present invention addresses the need for better ways to perform real-time collision detection among freely moving, complex objects with a system or machine that detects collisions among objects represented in a voxel-based format.

In conventional graphics, collision detection is slow because it is computationally intensive. In conventional graphics, each object is represented by lists of polygons, primitive surfaces, or primitive geometries. Complex objects can consist of tens of thousands to hundreds of thousands of these geometrical primitives. When an object moves in virtual space, each element of the object must be checked against the elements of all of the other objects by mathematically solving for intersections of the elements. It will be appreciated that, as the objects become more complex, the amount of computation required to detect the collisions between objects can increase exponentially. Although there are algorithms to reduce the number of mathematical intersections that must be calculated, these are less effective for freely moving complex objects that are in close contact.

In contrast, in accordance with the subject invention, collision detection for voxel-based objects does not require any mathematical analysis and hence it is simple and fast. Objects are represented by sampled data points that are physically stored at regularly spaced positions in memory. As objects are moved in the virtual world, the data is shifted in memory. Collisions are detected automatically when a data voxel from one object tries to write into a memory cell that is occupied by the voxel of another object. These collision detections can be used to limit or control movement of the objects. The present invention enables real-time detection of collisions among relatively complex three-dimensional, voxel-based graphical objects on a high end graphics workstation.

In one embodiment, voxel-based objects are controlled and manipulated such that collisions are automatically detected during object movement and the graphical objects are prevented from penetrating each other. Applications include computer graphics and animation, CAD/CAM, and virtual reality applications that require real-time interaction between complex three-dimensional object models.

In one embodiment, collision detection among voxel-based objects requires that a voxel-based occupancy map of the entire virtual space be maintained. The voxels of individual objects in the virtual space are mapped onto the occupancy map. As objects move about the virtual space, the occupancy map is updated so that each voxel is either empty or contains the code of the object which lies there. Moving objects in the virtual space involves shifting coded voxels in memory of the occupancy map, with collisions being detected automatically when data from one object tries to write into a memory cell that is occupied by another object. Hence, unlike conventional graphics, collision detection in volume graphics is independent of object complexity and depends only on the number of sampled data points in an object. The speed of collision detection in a volume graphics representation is limited only by memory access rates.

In one embodiment, two separate data structures are used to minimize storage requirements and maintain the integrity of complex, moving objects while providing an easily updated structure for the virtual environment. An occupancy map with dimensions of the virtual environment is used to monitor interactions among objects and global changes in the environment. Each element of the occupancy map is large enough for a single address and contains either a null pointer or an address of an object voxel data structure. Voxel data structures consisting of elements such as color, opacity, reflectance coefficients, vector gradient, material properties, position, neighbor addresses, etc. are stored in compact object arrays. The occupancy map is initialized by mapping the addresses of voxels in each object into the occupancy map using the voxel positions in object space coordinates and a mapping transformation from object space to the virtual environment space.

In summary, when modeling objects in a virtual environment, it is important to model interactions between objects in a physically realistic way. For example, in most cases, objects must be prevented from penetrating each other and they should react to collisions by exchanging momentum and energy and possibly by deforming on impact. The first step of modeling interactions between objects requires the detection of collisions between moving objects.

In surface-based graphical formats, objects are modeled as lists of polygons or other primitive surfaces elements. In this format, each element is essentially a set of mathematical equations or conditions. For example, a single three-sided polygon consists of an ordered list of three vertices. The polygon surface element is the intersection of three half planes defined by the polygon vertices. In order to detect a possible collision between two objects, each element in the first object must be checked for intersection with many elements in the second object. This amounts to solving for an intersection between two sets of mathematical equations and conditions for each possible combination of object elements. Reasonably complex objects may consist of many thousands of surface elements. Although algorithms have been introduced that reduce the number of element pairs that must be checked for intersection, collision detection between complex objects remains one of the major computational efforts in computer applications which perform physically realistic modeling or simulation.

In contrast, collision detection for voxel-based objects is conceptually simple and does not require any mathematical analysis. As objects are moved in the virtual environment, object voxel addresses are simply shifted in the occupancy map array. Collisions are detected automatically when a voxel address from one object tries to write into an occupancy map cell that is already occupied by the voxel address of another object.

BRIEF DESCRIPTION OF THE DRAWINGS

These and other features of the subject invention will be better understood taken into conjunction with the Detailed Description in conjunction with the Drawings of which.

DETAILED DESCRIPTION

Figure 1A:
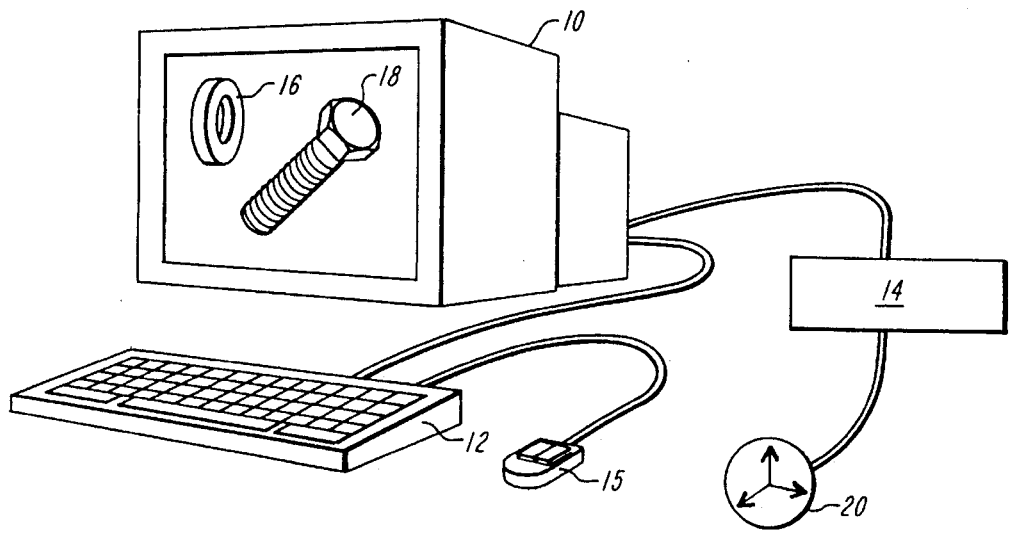
FIG. 1A is a diagrammatic representation of the major hardware components required in an interactive environment for visualizing and manipulating voxel-based graphical objects.

Referring to FIG. 1, the hardware that is used in this embodiment consists of a high-end graphics workstation 10 for computation, memory storage, and image display, a keyboard 12 or other input device to interact with a user interface for high-level program control, and an input tracker 14 that can be used to change the position and orientation of the graphical objects 16 and 18. In one embodiment, this input tracker consists of a two degree-of-freedom computer mouse 15 that can be used to control the position or orientation of a two-dimensional object or two of the six degrees of freedom of a three-dimensional object. In a second embodiment, a six degree-of-freedom tracker 20 is used to control the position and orientation of a three-dimensional graphical object.

Figure 1B:
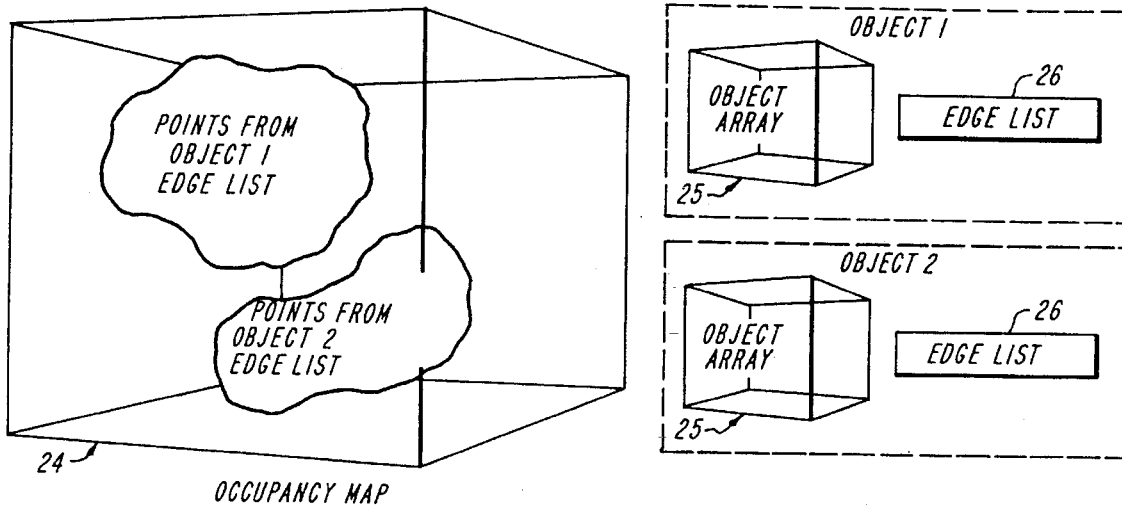
FIG. 1B is a diagrammatic representation of the three memory structures required in one embodiment of the present invention.

Referring now to FIG. 1B, in one embodiment, information about the objects and the virtual space is maintained in three separate data structures 24, 25 and 26. These three separate data structures are required to work around memory limitations and memory access patterns of modern graphics workstations. However, it will be appreciated that an alternate memory architecture would enable all of the information in the three data structures to be built into one large array that could be quickly accessed, for example, in a parallel memory architecture, to perform collision detection, object manipulation, and visualization.

Data structure 24 is an array the size of the virtual space, called the occupancy map, that is used to encode which voxels are occupied by which objects. Elements of occupancy map 24 contain either an object code number or a code number indicating an empty voxel.

Data structure 25, called an object array, exists for each object and contains the voxel color, transparency, and other visual, structural, and material properties for each sampled point in the object. In one embodiment, object array 25 contains voxel color, transparency, and a surface normal vector. Contents of object array 25 voxels are not changed as the object is moved so that motion errors do not accumulate. Object arrays 25 are used as a data source for volume rendering. Two-dimensional views through each object are calculated and composited when a view through the entire virtual space is created. Relative distances of the objects from the image plane are used to determine the composition order. Data structure 26 is the edge list which exists for each object in the virtual space and contains the original and current positions of each point used to fill the occupancy map. In one embodiment, this list consists of the edge or surface points of each object. In a second embodiment, this list both interior and surface points and is created on-the-fly from object array 25 during each object movement. It will be appreciated that edge list 26 can consist of edge or surface points and/or interior object points depending on the application.

Figure 1C:
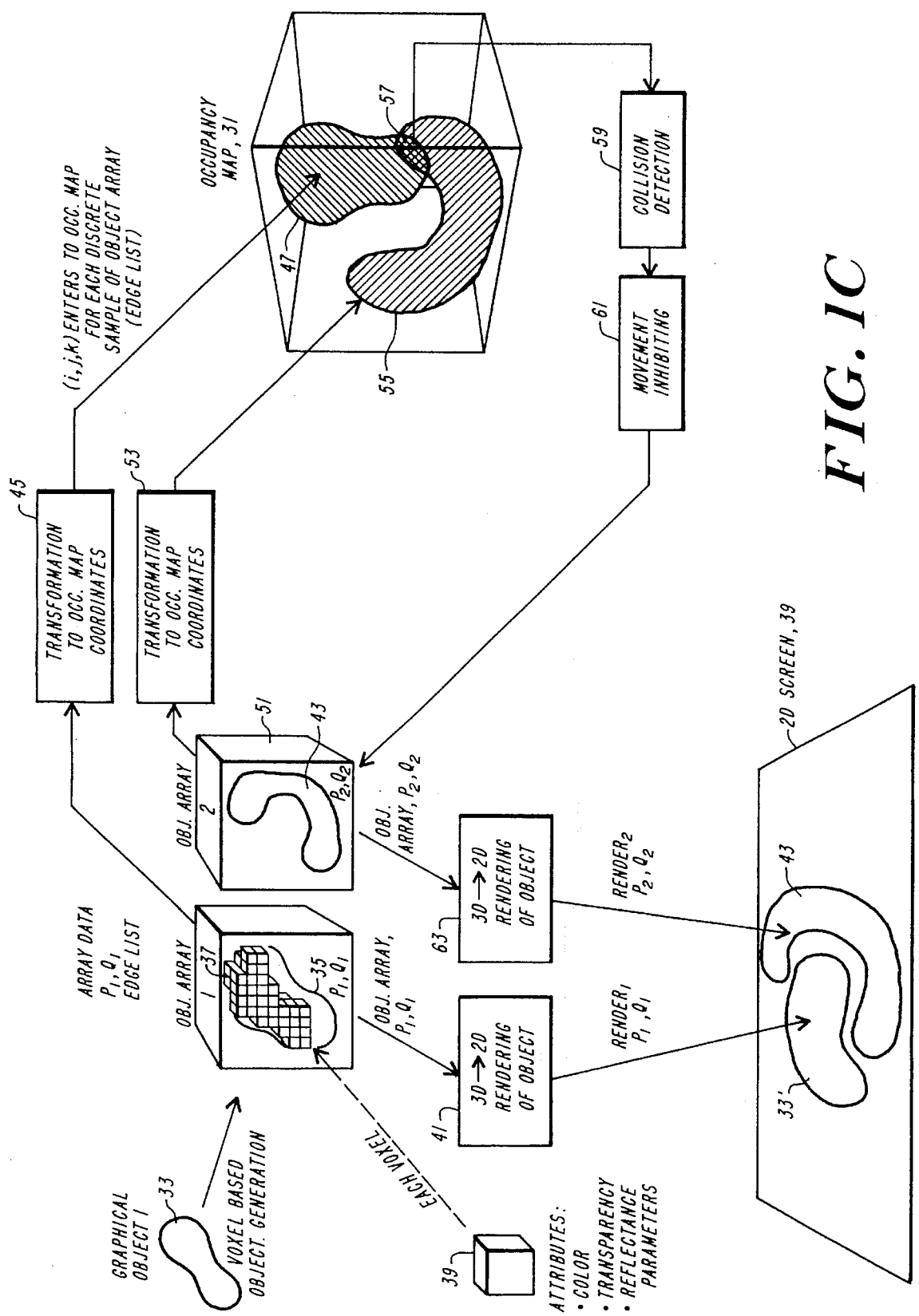
FIG. 1C is a diagrammatic representation the conversion of a graphical object into an object array representation which is in turn transformed into locations within an occupancy map for collision detection purposes.

Referring now to FIG. 1C, in general an occupancy map 31 is generated starting with a graphical object 33. The original data or object description in the graphical object is converted into a voxel-based representation 35 in an object array 37 in which the array has position P1 and orientation Q1 as illustrated. Each voxel 39 may have attributes including color, transparency, and reflectance parameters amongst others. Thus each voxel in object array 35, in addition to having a specified position and orientation can be provided with data indicating any one of a number of attributes.

The data in object array 37 may be utilized in the rendering of the graphical object on a 2D screen 39 as illustrated by object 33'. This is accomplished through the utilization of a volume renderer 41 which converts the 3D voxel-based representation from the object array to a 2D rendering of the object. When it is important to position a second graphical object 43, adjacent to a previously rendered object 33', it is important that such a rendering be inhibited if, in the movement of the second object, it contacts or penetrates the already existing object.

In order to detect such collisions, voxels in the object array are transformed into occupancy map coordinates at 45 such that the addresses or codes representing the object are stored at 47 in the occupancy map. As will be appreciated, in one embodiment, the position of one voxel in the occupancy map is designated (i,j,k). This positional data is thus entered for each discrete voxel of the object array. It will be appreciated that in order to simplify processing, not every voxel in the object array need be entered into the occupancy map, rather, as described before, only those voxels representing edges of an object need be considered. Such voxels are obtained from the aforementioned edgelist for the object.

As illustrated at 51, an object array contains a representation of object 43 which is desired to be moved relative to object 33. As a result, as illustrated at 53, the object data is transformed to occupancy map coordinates, which are then entered into occupancy map 31 as illustrated at 55. As can be seen, occupancy map codes or addresses 47 and 55 are seen to overlap at a region 57 indicating a collision which is detected at 59. Upon detection of a collision, movement of object 43 may be inhibited as illustrated at 61 which inhibits the 3D to 2D rendering of this object by volume renderer 63.

While the Subject System will be described in terms of the inhibiting of the movement of objects upon the collision detection, it will be appreciated that it is possible to permit interpenetration of one object into another in some circumstances. Such an application includes permitting interpenetration based on a force vector associated with the voxels at the edge of an object.

Figure 2:
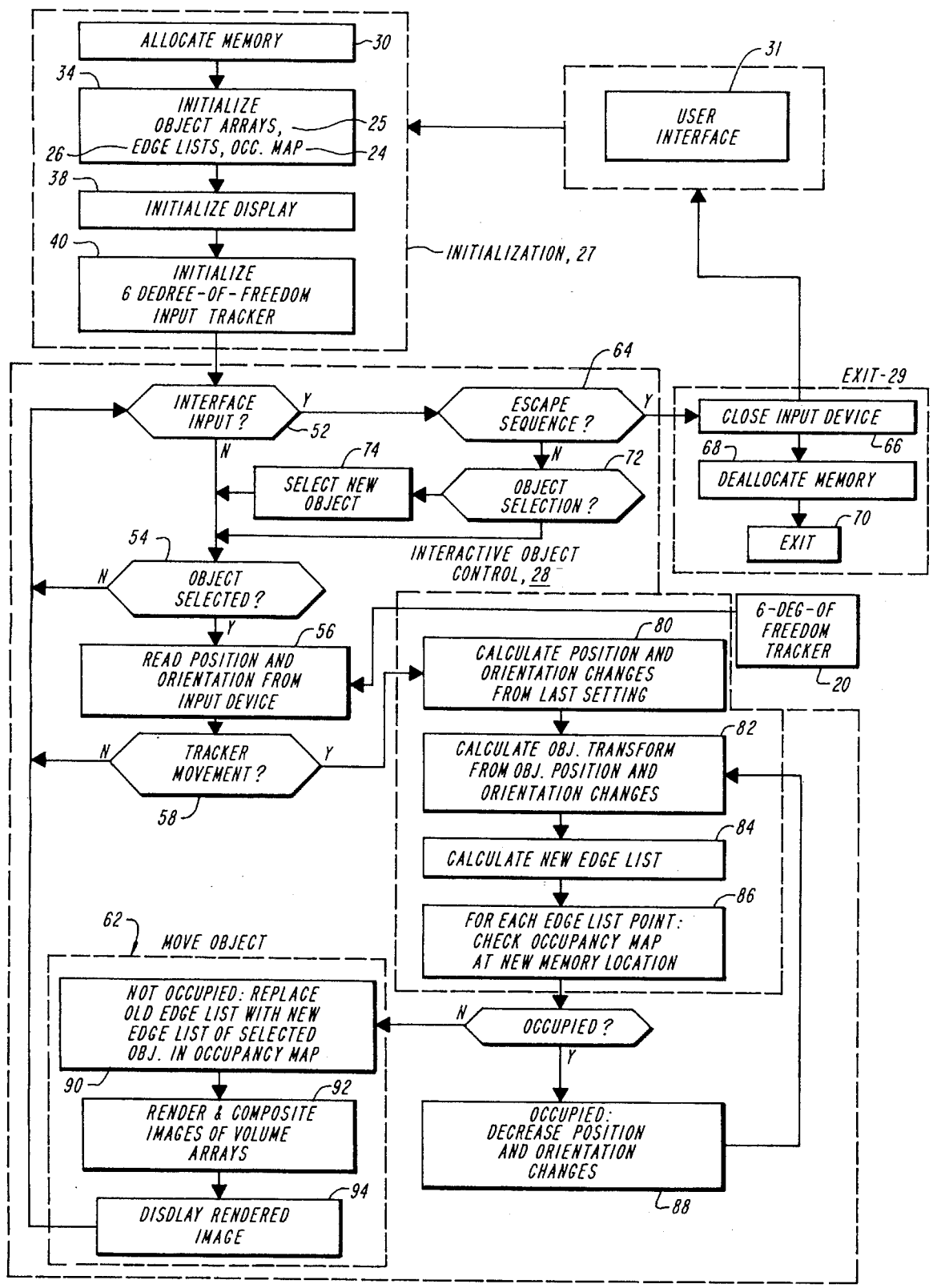
FIG. 2 is a flow chart which outlines the basic steps required in one embodiment of the present invention for detecting collisions among voxel-based graphical objects.

Referring to FIG. 2, the main components of one software implementation of the present invention consist of an initialization step 27, a main loop 28 where the interactive control of object positioning is performed, and a exit sequence 29 to end the interactive session.

In the initialization sequence, 27, memory is allocated at 30 for each of the three data structures. Stored object data is read into the object arrays 25 of FIG. 1B to initialize the volume data at 34. At this point, the edge lists 26 are either calculated from the object arrays 25 or read in from storage at 34. Next, edge lists 26 and original position and orientations of the individual objects are used to initialize occupancy map 24. Finally, the graphical display on workstation 18 is initialized at 38 and the input tracker 20 is initialized at 40.

In operation, the system implements four major functions. The first is checking for input from the user interface, 31, at 52 to look for high-level program control. The second function is looking for movement of input tracker 20 at 56 and 58. The third function as illustrated at 60 is detecting collisions between the selected, moving object and other objects in the virtual space. The fourth function as illustrated at 62 is moving the selected object and displaying the new scene to the user once it has been determined that no collisions occur.

In the first function, the user interface 28 is checked for input at 52. If an input has occurred, the program branches to the exit sequence 29 if an escape sequence is detected at 64. In the exit sequence, input tracker 20 is closed as illustrated at 66, memory is de-allocated as illustrated at 68 and the program is exited as illustrated at 70. If an object selection input is detected at 72, the indicated object becomes the selected object at 74 and the old position and old orientation of tracker 20 are set to the current position and orientation of tracker 20. Any other system input is ignored in this embodiment.

In the second function, if an object is currently selected, the position and orientation of input tracker 20 are read at 56. If the new position and orientation are significantly different from the old position and old orientation of tracker 20, then movement of the device is detected at 58 and the program branches to 60 to look for collisions at the desired new position and orientation. If no object was selected or if no significant movement of the tracker is detected, then the program loops back to the first function of the main body at 52.

In the collision detection function 60, the desired position-step is defined at 80 to be the difference between the new position of tracker 20 and its old position. The desired position of the selected object is calculated at 82 to be the current position of the selected object plus the position-step. The desired orientation-step is defined at 80 to be the rotation that takes tracker 20 from its old orientation to its new orientation. In this embodiment, orientations are represented by quaternions. Quaternions are frequently used in graphics to encode rotations because they are less prone to cumulative errors than rotation matrices. They consist of two parts, a constant and a three-dimensional vector and were first introduced by Sir William R. Hamilton in 1843. Using quaternions to represent orientations and orientation changes, the desired orientation is obtained at 82 by pre-multiplying the current orientation quaternion by the orientation-step. However, it will be appreciated that orientations may be represented by rotation matrices so that the desired orientation matrix is calculated by pre-multiplying the current orientation matrix by the orientation-step matrix.

Given the desired orientation and position of the selected object, a new edge list 26 is created at 84 by updating the current positions of each element in the list and Occupancy map 24 is checked at points corresponding to each point in new Edge list 26 at 86. If any of the corresponding points in the Occupancy map are occupied by other objects, a collision occurs and a bisection method is used at 88 to reduce both the position-step and the orientation-step until the largest position and orientation steps are found that are less than or equal to the desired steps where no collisions occur. When the collision-free position and orientation steps are found, the program proceeds to the move object function, 62.

In the move object function, 62, occupancy map 24 is updated at 90 by subtracting the old edge list and adding the most current edge list corresponding the position and orientation steps which caused movement of the selected object towards the desired position and orientation but resulted in no collisions. The current position and orientation of the selected object are updated and old position and old orientation of the tracker are reset using the final position-step and orientation-step. Finally, the scene is re-rendered in 92 by compositing a volume rendered image of the selected object in Object array at its new position and orientation with volume rendered images of other objects in the scene. The scene is displayed in 94 on a computer screen to give visual feedback to the user at interactive rates.

It will be appreciated that while the subject system has been described in terms of characterizing an object by generating an edge list for purposes of collision detection, voxel representations of the object include interior structures. It will be appreciated that the entire object array can be used to update the occupancy map to accommodate flexible or deformable objects or to permit controlled penetration of an object into another object. However, including interior voxels in the occupancy map will increase computational load and memory requirements.

Figure 3A:
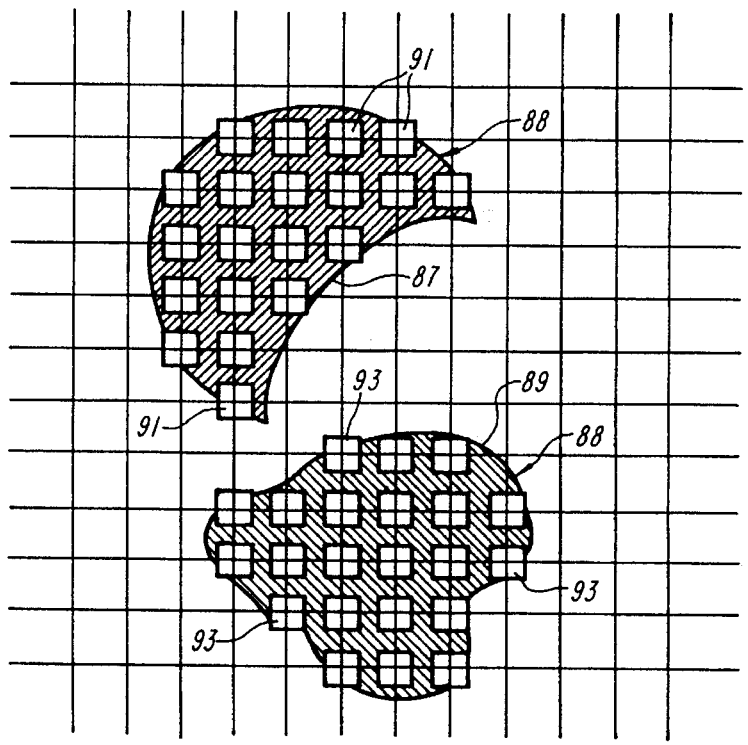
FIGS. 3A-3D are diagrammatic illustrations of a two-dimensional embodiment of collision detection among moving objects using the present invention.
Figure 3B:
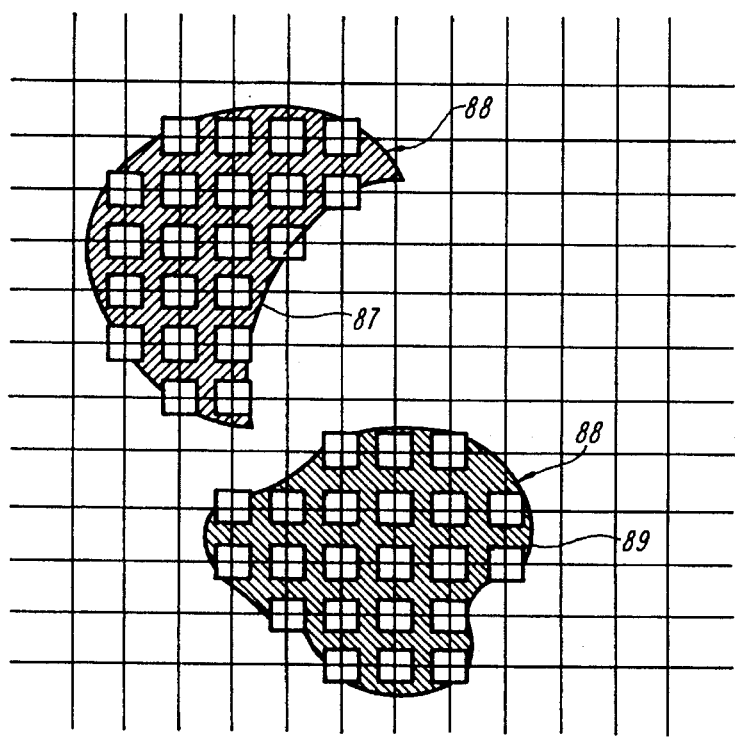
Figure 3C:
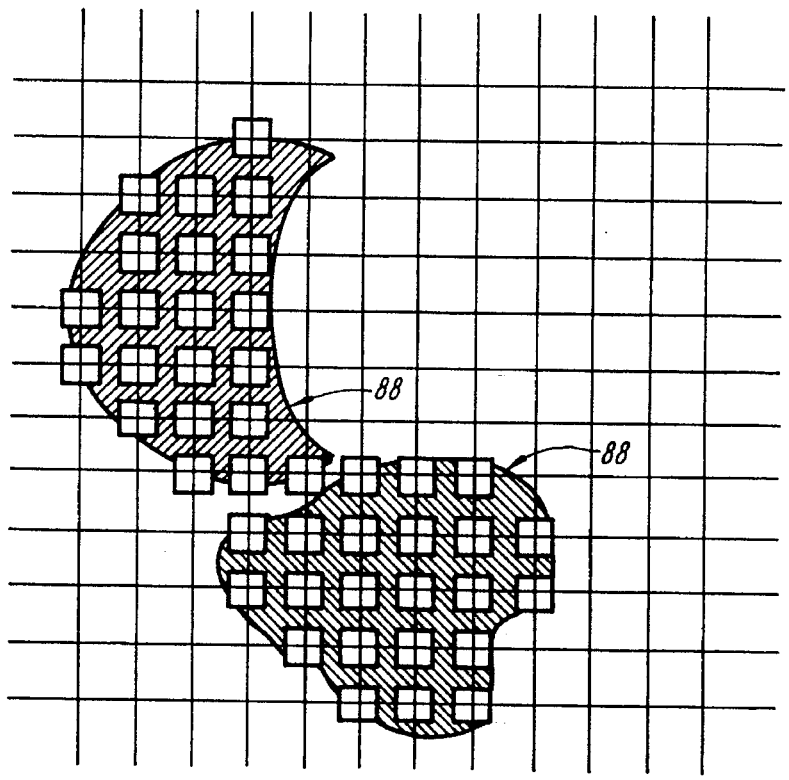
Figure 3D:
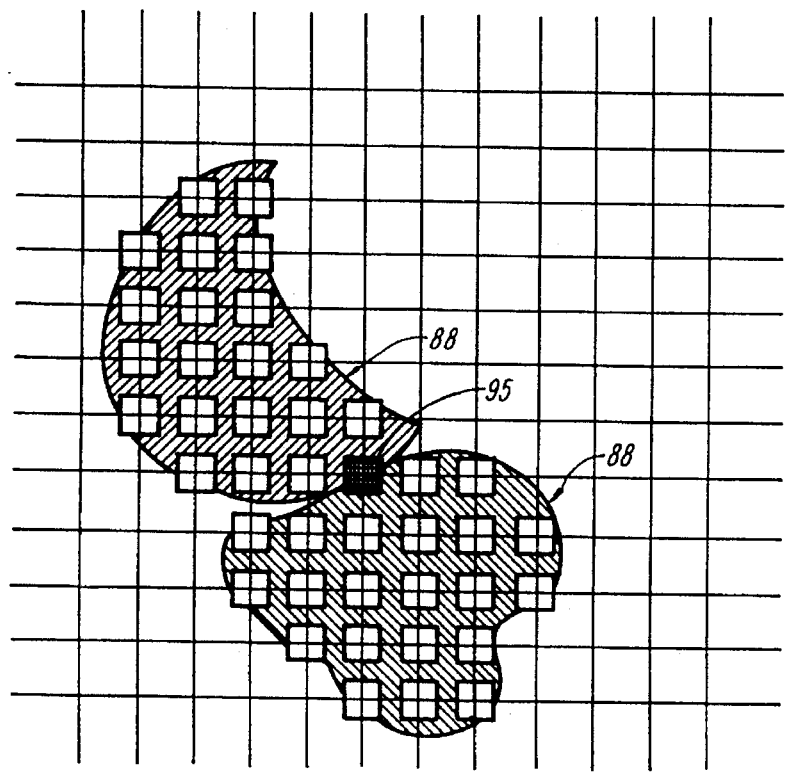

Referring now to FIGS. 3A–D, collision detection in accordance with the subject invention is diagrammatically illustrated for a two-dimensional object. In FIGS. 3A–D, the shaded objects 87 and 89 are mapped into the occupancy map at the discrete occupancy map cells 91 and 93. As the objects are moved in the virtual space, the cells 91 and 93 are updated as illustrated in FIGS. 3B, 3C, and 3D. In all of these figures, the shaded areas 88 represent the graphical object responsible for the mapping. When movement of the object results in overwriting of a point in memory that was previously occupied by the stationary object, one cell of 93 overlaps one cell of 91 as is illustrated at 95 in FIG. 3D, and a collision is detected.

The following is a simplified algorithm for detecting collisions and preventing objects from penetrating each other:

```
determine desired object position
while (stepsize to desired position > threshold) {
    for (all voxels in the moving object) {
        check occupancy map cells of desired positions
            to see if they are occupied
    }
    if (all occupancy map cells are free) {
        move the object into the desired position
        update the occupancy map
        exit
    }
    else if (any of the occupancy map cells is occupied) {
        avoid collision by reducing the step size
        update the desired position
    }
}
```

Figure 4:
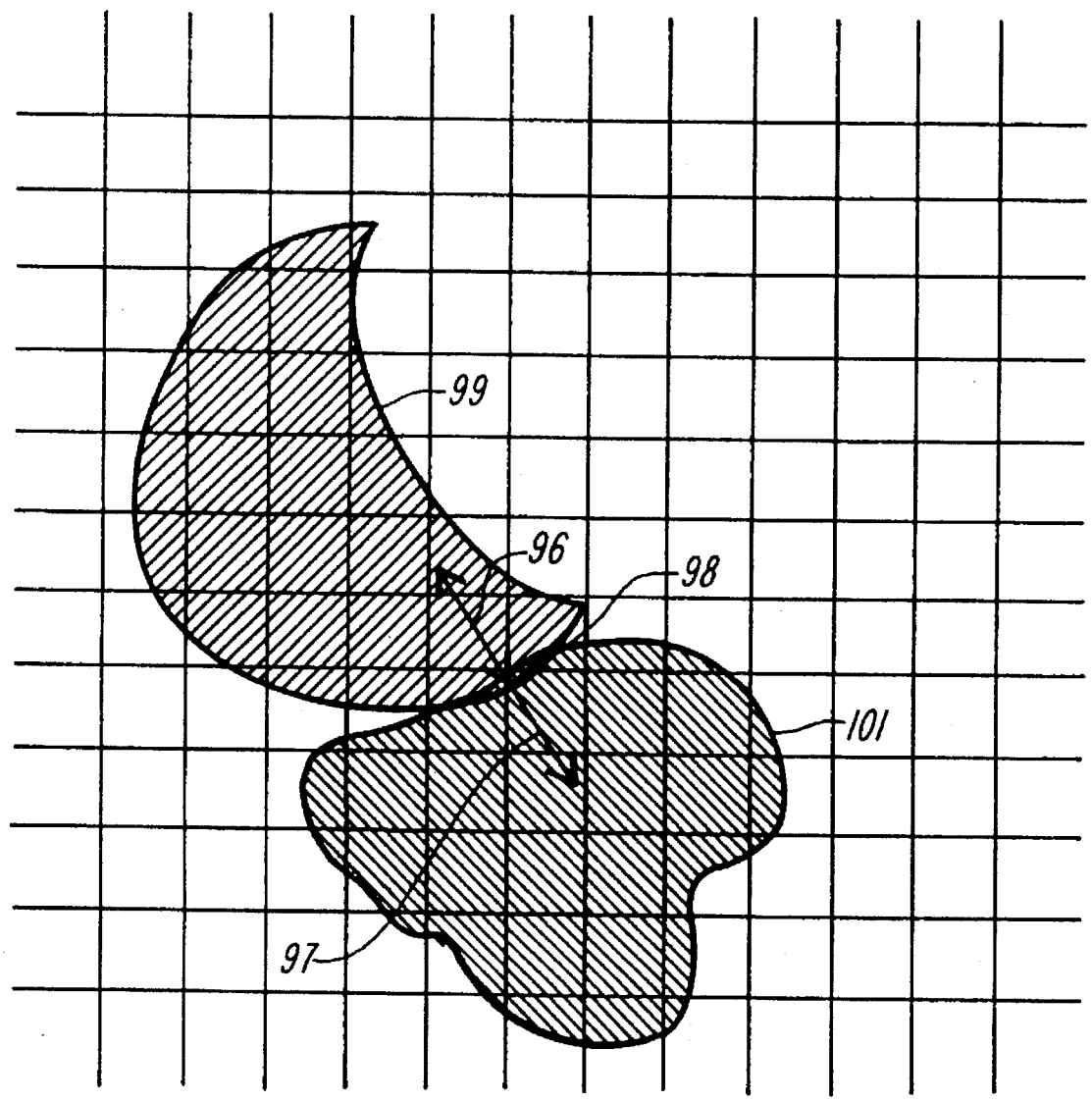
FIG. 4 is a diagrammatic illustration of how the present invention is extended to calculate forces between interacting bodies after a collision is detected.
Figure 5A:
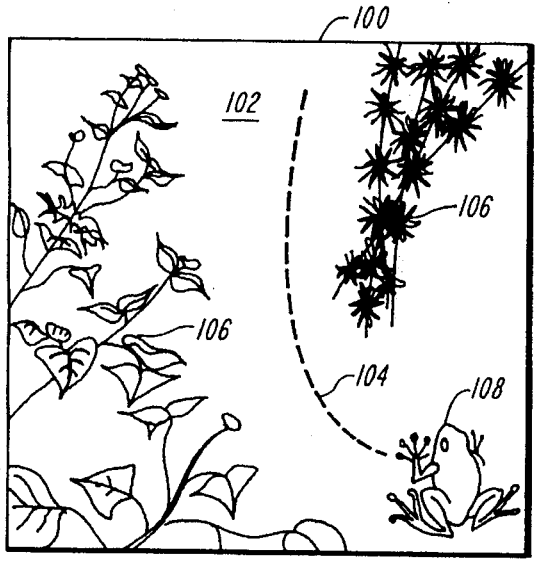
FIGS. 5A-5D are diagrammatic illustrations of a two-dimensional embodiment of the present invention illustrating its use in a complex two-dimensional maze.
Figure 5B:
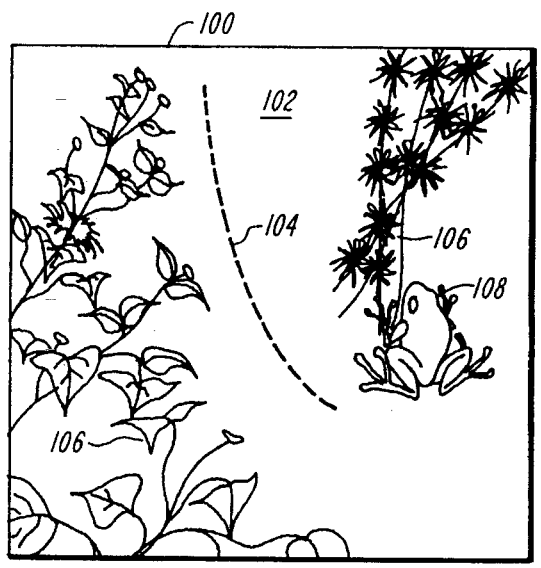
Figure 5C:
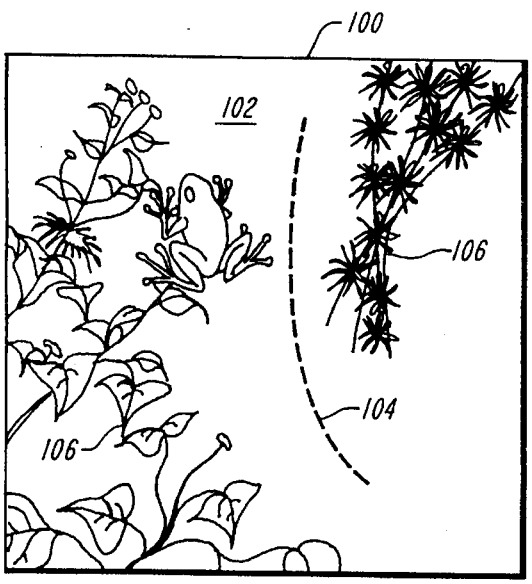
Figure 5D:
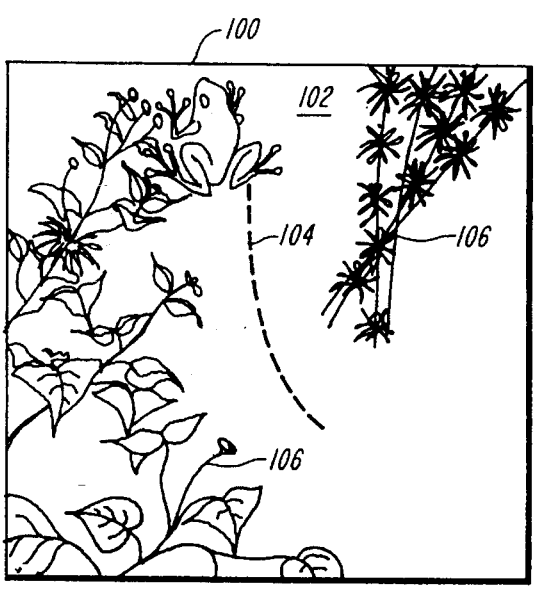
Figure 6A:
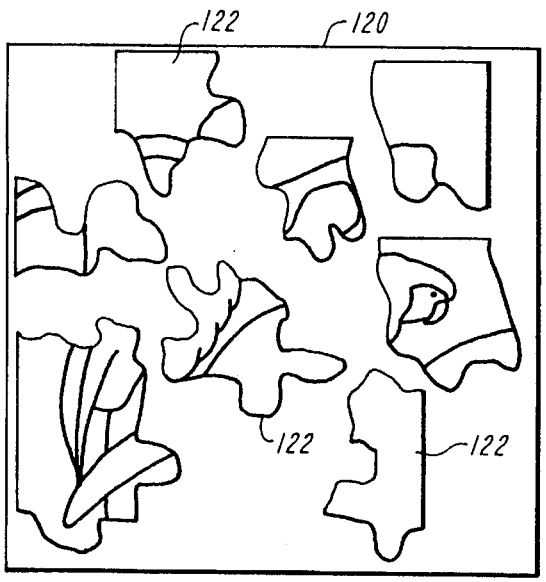
FIGS. 6A-6D are diagrammatic illustrations of a second two-dimensional embodiment of the present invention illustrating its use in assembling a two-dimensional jigsaw puzzle.
Figure 6B:
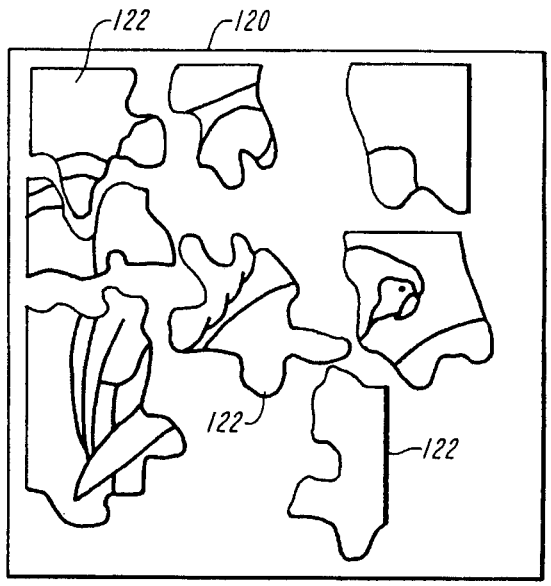
Figure 6C:
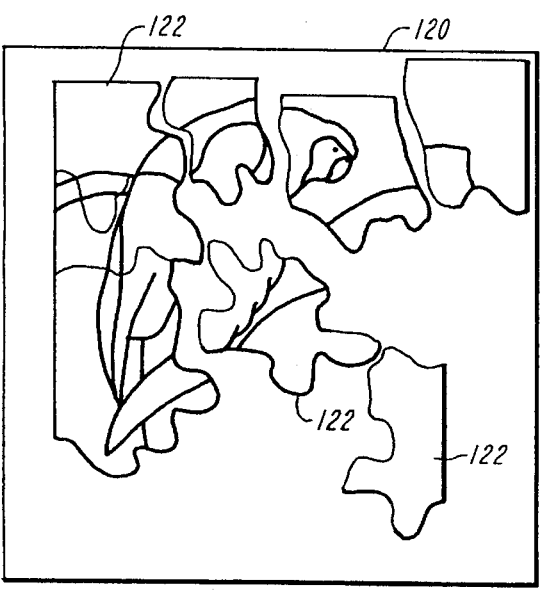
Figure 6D:
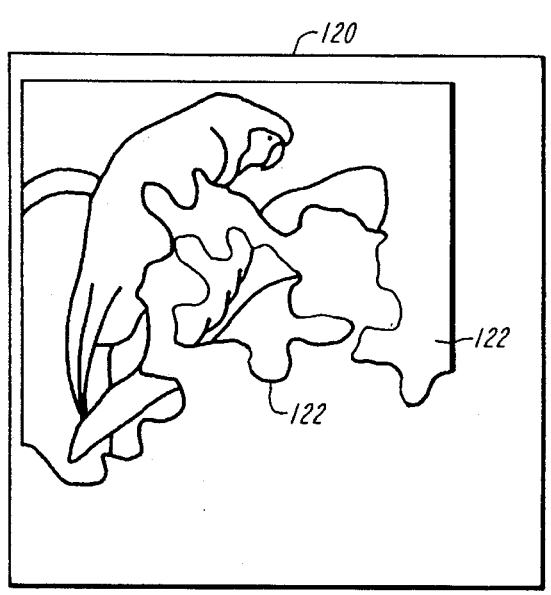
Figure 7A:
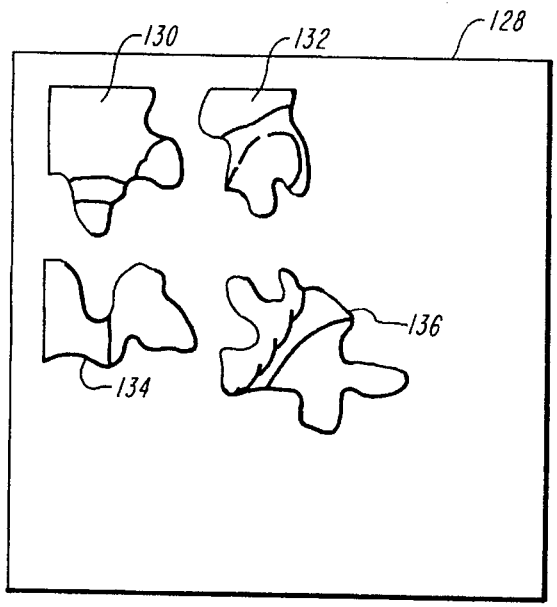
FIGS. 7A-7D are diagrammatic illustrations of the second two-dimensional embodiment of FIGS. 6A-6D illustrating its use in testing whether a proposed design can be physically assembled.
Figure 7B:
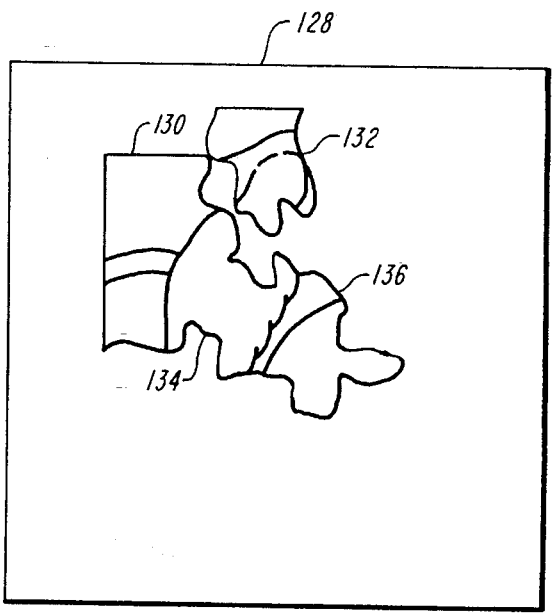
Figure 7C:
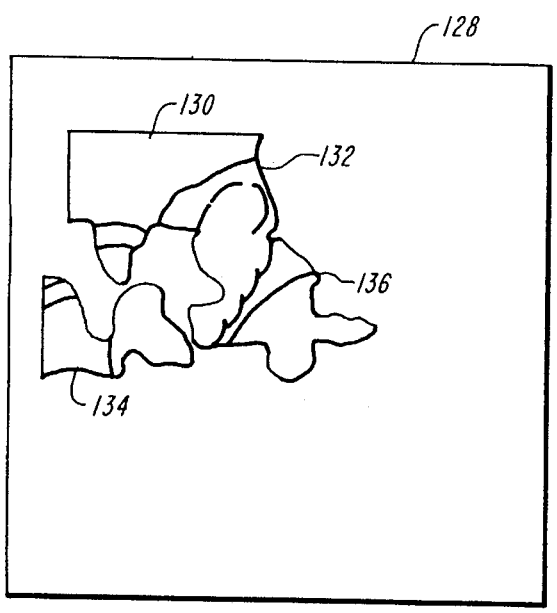
Figure 7D:
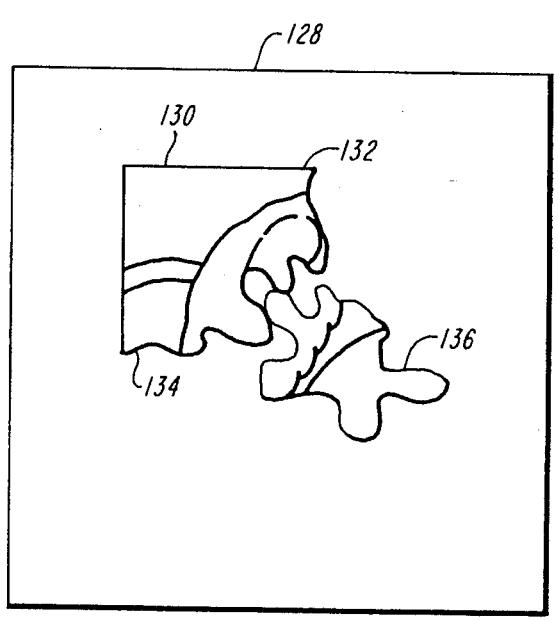

In this embodiment, detection of a collision results in a reduction of the size of the desired step until no collision occurs. The result of this reaction to collisions is that no two objects are ever allowed to interpenetrate. It will be appreciated that other reactions to collision are possible. For example, reactions to collisions between particular objects could be ignored. As a second example, objects could be allowed to interpenetrate but collisions could be indicated to the user either visually, by indicating collision locations in the visualization of the virtual space, auditorily, or tactily if the input tracker is equipped with a force feedback system. As a third example, locations of collisions could used be calculate reaction forces in a graphics system that uses physically based modeling. The calculation of impact forces 96 and 97 at a detected collision point 98 of graphical objects 99 and 101 is illustrated diagrammatically in FIG. 4. It will be appreciated that inclusion of a normal vector and/or material properties in the edge lists and object arrays would facilitate the force calculations.

Referring to FIG. 5A–5D, one embodiment of the present invention is a two-dimensional maze 100 consisting of an area 102 containing a path 104 through the maze defined by leafy regions 106 that can not be entered. Maze 100 is populated by tree frogs 108 that can move about under the control of a 2D computer mouse (not shown in this figure). The intricate nature of the walls of the maze and the toes of the frogs would make collision detection calculations prohibitively large in a conventional graphics representation of this maze . However, when both the maze walls and the frogs represented in a voxel-based format, collisions between the walls of the maze and the frog are easily detected using the present invention so that the frogs can be moved about in real time.

Referring to FIG. 6A–6D, a second embodiment of the present invention is a two-dimensional jigsaw puzzle 120. Using a voxel-based data representation of the puzzle pieces 122 and the present invention to detect collisions, the puzzle can be interactively assembled even when the edge shapes are quite complicated.

A third application of the present invention is presented in FIGS. 7A–7D. In these figures, the four pieces 130, 132, 34 and 136 of puzzle 128 shown each fit individually with their neighbors. However, there is no way to assemble the four pieces together without lifting one of them out of the plane of the puzzle. It will be appreciated that the problem demonstrated by this figure is known in design and manufacturing as "assemblability". Simply put, it is possible to design a system where all parts of the system fit together but where there is no physical way to assemble the system. Although it is possible to generate heuristics to help avoid this problem in two-dimensional systems, the problem becomes much more difficult in three-dimensional systems. It will be appreciated that one application of the present invention is a means to test the assemblability of systems before they are manufactured.

Figure 8A:
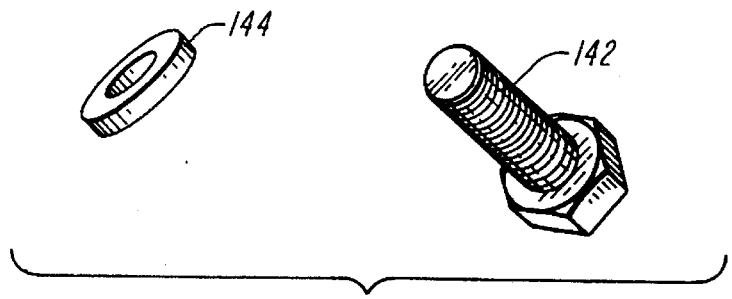
FIGS. 8A-8C are diagrammatic illustrations illustrating the three-dimensional embodiment of the present invention showing object orientation and position control.
Figure 8B:
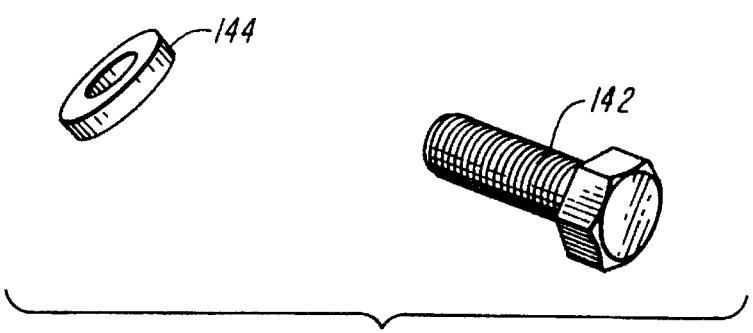
Figure 8C:
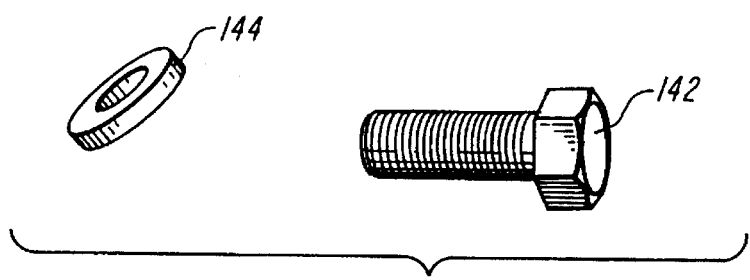
Figure 9A:
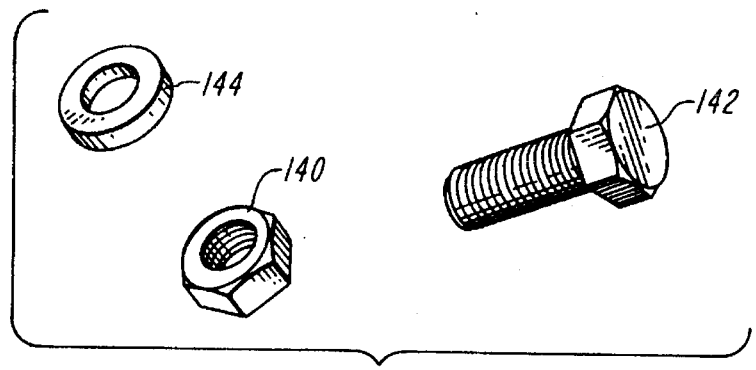
FIGS. 9A-9C are diagrammatic illustrations of a three-dimensional embodiment of FIGS. 8A-8C illustrating collision between the object, the walls of the environment, and other objects.
Figure 9B:
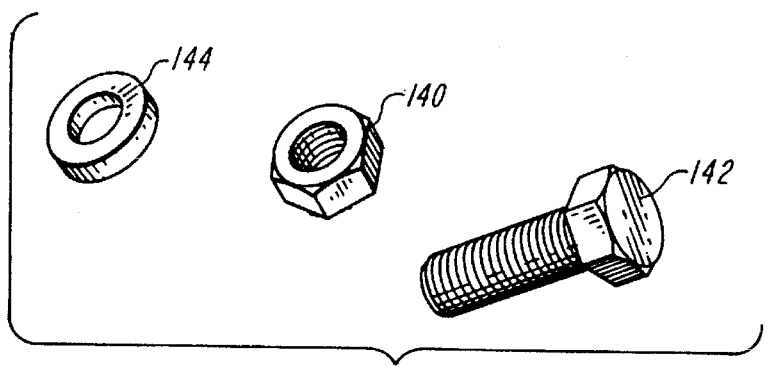
Figure 9C:
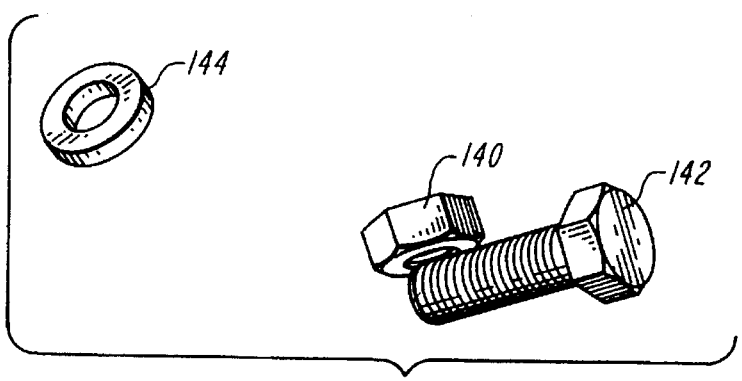
Figure 10A:
FIGS. 10A-10C are diagrammatic illustrations of the three dimensional embodiment of FIGS. 8A-8C illustrating interactive assembly of two voxel-based objects.
Figure 10B:
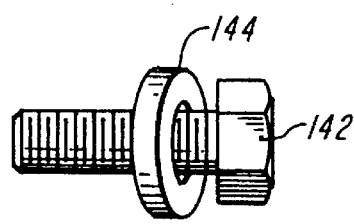
Figure 10C:
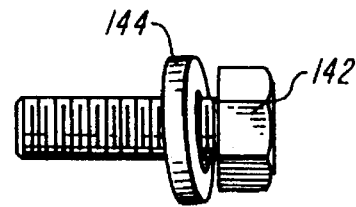

Referring to FIGS. 8A–8C, 9A–9C, and 10A–10C, an additional embodiment of the present invention is a three-dimensional interactive assembly system. In this embodiment, objects such as a nut 140, bolt 142, and washer 144 illustrated in the figures are represented in a voxel-based format and are interactively controlled by a 6 degree-of-freedom position and orientation tracker 20. FIGS. 8A, B and C illustrate control of position and orientation of bolt 142. FIG. 9A, B and C illustrate control of nut 140 and collisions between nut 140 and the bolt 142 as seen in FIG. 9C. The position control and collision detection is performed in real time. FIGS. 10A, B and C illustrate interactive assembly of washer 144 and bolt 142.

One direct application of the voxel-based collision detection and avoidance algorithms is a system to haptically explore or "feel" the 3D surface of a virtual object. Haptic, or tactile, exploration will enhance visualization methods for complex data and provide valuable feedback in the simulation of deformable objects. Using the proposed data structures along with a relatively small voxel-based model of the user's hand or fingertip, the computation required to detect and avoid collisions between the user's hand and the data is small even when the data itself is very large and complex. In a voxel-based system for haptic exploration, the object data is stored in a large static data array. A small voxel-based object representing the user' hand or fingertip is shifted through the data array, tracking movement of the user's hand. When a voxel of the hand model encounters a voxel belonging to the object, a force feedback device is used to limit the hand movement to avoid penetration of the virtual object by the hand model. Using object-based volume rendering, pre-computed, high quality images of the volume data can be composited with dynamically computed image of the hand. As long as the hand model is small enough for fast rendering, visualization of the system will be fast enough for interactive use.

By way of example, consider for instance the haptic exploration of a high resolution 3D CT scan of a human hip. In such a system, a force feedback system is used to track the user's fingertip position in the virtual environment. The fingertip position is represented by a single voxel in the occupancy map. When the fingertip voxel encounters voxels belonging to the hip surface, the force feedback device prevents the user's fingertip from moving in a direction that would penetrate the virtual object, allowing the user to "feel" the hip surface. Stereo pairs of 3D volume rendered images of the hip data plus the fingertip are presented to the user via stereo goggles. Some control of the view point is enabled in real time using pre-computed volume rendered images of the hip data.

In one embodiment, a software implementation for the embodiment illustrated in FIGS. 8, 9, and 10, follows:

```
/* .................... VG_demo.h ....................
 *
 * This file has the includes, defines, type defs and function
 * definations for VG_demo programs.
 *
 */

/* include files */
#include <sdtlib.h>
#include <math.h>
#include <stdio.h>
#include <time.h>
include <fcntl.h> include <errno.h>
include <strings.h>
include <termios.h> include <X11/Xlib.h>
include <X11/X.h>
#include <X11/Xutil.h>
#include <X11/Xos.h>
#include <X11/Xatom.h>
#include <X11/Xmu/StdCmap.h>
include <X11/keysym.h> include <GL/glx.h>
include <GL/glu.h>

/* defines */
define byte unsigned char define PMODE 0666
define TRUE 1                                    /* boolean values for testing */
define FALSE 0 define define IMAGE_SIZE 256                     /* height and width of display image */
define define PLANE_SIZE IMAGE_SIZE*IMAGE_SIZE                   /* image area */
#define MAXOBJECTS 3                              /* max. num. of objects */
#define MAX_OBJECT_SIZE 83                        /* max. object edge size */
#define MAX_PROJ_LENGTH MAX_OBJECT_SIZE * 2
define MAXEDGE 64*64*64                          /* maximum number of edge points */ define BKGD 100                                  /* occupancy code for background pixels */
define FIXED 99                                  /* occupancy code for fixed object pixels */
#define MAXSTEP 64                                /* max dist. object can move in one step */
#define MAXROTATION 0.50                          /* max rotation angle for one step */
#define MINDISP 1.0                               /* min displacement for object */

/* global variables */
Display *dyp;
Window win;
Atom wmDeleteWindow;
```

-continued

```
/* type definations */
typedef struct VG_VectorStruct {                    /* integer position vector */
    int i, j, k;
} VG_VECTOR;

typedef struct VG_FvectorStruct {                   /* floating pt. pos. vect. */
    float x, y, z;
} VG_FVECTOR;

typedef struct VG_QuaternionStruct {                /* orientation quaternion */
    float r;                                        /* real, scalar component */
    float i, j, k;                      /* imaginary, vector component (rot axis) */
} VG_QUATERNION;

typedef struct VG_RotMatrixStruct {                 /* rot. matrix struct. */
    float ii, ij, ik;
    float ji, jj, jk;
    float ki, kj, kk;
} VG_ROTMATRIX;

typedef struct VG_ObjectDataStruct {
    VG_VECTOR size;                                 /* object size */
    VG_FVECTOR position;                            /* object position (x, y, z) */
    VG_QUATERNION quaternion;                       /* unit orientation quaternion */
    byte *data;                                     /* object intensity */
} VG_OBJECTDATA;

typedef struct VG_ProjectionStruct {
    int proj_size;                                  /* projection size */
    float *proj;                                    /* projection intensity */
} VG_PROJECTION;

typedef struct VG_ObjectEdgeStruct {
    int edge_size;                                  /* number of edge elements */
    VG_VECTOR *edge;                    /* edge elements in object coordinates */
    VG_VECTOR *trans_edge;                 /* edge elements in world coords */
} VG_OBJECTEDGE;

/* function declarations */

/* term.c */
extern int opentty(char *, int);
extern int wtty(int, char *, int);
extern int rtty(int, char *);

/* display.c */
Colormap getColormap(XVisualInfo * vi);
void initialize_display(float *image);
void redraw(float *image);
void fatalError(char *message);

/* initialize.c */
int get_object_data(char *name, VG_OBJECTDATA *obj);
ing get_object_edge(char *name, VG_OBJECTEDGE *obj);
int get_object_info(char *namefile, int *numobjects,
            char data_file[MAXOBJECTS] [60],
            char edge_file[MAXOBJECTS] [60],
            VG_FVECTOR *position, VG_QUATERNION *quaternion,
            VG_VECTOR *size);
void init_data(char *filename, int *numobjects, VG_OBJECTDATA
*obj,
            VG_OBJECTEDGE *edge);
void init_occmap(byte *occ, int numobjects, VG_OBJECTDATA *obj,
            VG_OBJECTEDGE *obj_edge);
int init_projections(VG_OBJECTDATA *obj,
            VG_PROJECTION *obj_proj, int numobjects);

/* math_utils.c */
VG_QUATERNION axis_and_angle_to_quaternion(float angle,
            VG_FVECTOR axis);
VG_ROTMATRIX quaternion_to_matrix(VG_QUATERNION quaternion);
VG_QUATERNION mult_quaternion(VG_QUATERNION q1,
            VG_QUATERNION q2);
int nearest_int(float f);
VG_QUATERNION normalize_quaternion(VG_QUATERNION quaternion);
float quaternion_dot_product(VG_QUATERNION *q1,
            VG_QUATERNION *q2);
```

```
/* move_object.c */
void add_edge(byte *occ_map, VG_VECTOR *edge, int edge_size,
              int object);
void calc_new_edge(VG_FVECTOR new_position,
                   VG_QUATERNION new_quaternion,
                   VG_VECTOR *edge, VG_VECTOR *new_edge,
                   int edge_size, VG_VECTOR *object_size);
void check_displacements(VG_FVECTOR *d_position,
                         VG_QUATERNION *d_quaternion);
int check_occupied(byte *occ_map, VG_VECTOR *edge,
                   int edge_size, int object);
int check_step_size(VG_FVECTOR *p, VG_QUATERNION *q1,
                    VG_QUATERNION *q2, int size);
int move_object_edge(VG_OBJECTEDGE *obj_edge, int object,
                     byte *occ_map, VG_FVECTOR *position,
                     VG_QUATERNION *quaternion,
                     VG_FVECTOR *d_position, VG_QUATERNION
                     *d_quaternion,
                     int proj_size, VG_VECTOR *object_size);
void subtract_edge(byte *occ_map, VG_VECTOR *edge,
                   int edge_size);

/* render.c */
void clear_image(float *image);
void composit(float *image, VG_PROJECTION *obj_proj,
              VG_FVECTOR displacement);
void project(byte *object, VG_VECTOR size, float *proj,
             int proj_length, VG_QUATERNION quat);

/* . . . . . . . . . . . VG_demo.c . . . . . . . . . . . . . . . . .
 *
 * This demo program illustrates the elements of a volume
 * graphics based interactive assembly application. Objects are
 * stored as volumes of 1 byte intensity values and lists of
 * edge points. These objects are selected and manipulated with
 * input from a 6 degree-of-freedom input device, the Polhemus
 * 3BALL. As objects are moved in space, collisions are
 * detected and used to limit object movement. The entire scene
 * is displayed after rendering and compositing individual
 * objects using a highly simplified (for speed) volume render.
 * The scene is displayed on an SGI GL window.
 *
 * This version was created in September, 1994 by Sarah F.
 * Frisken Gibson at Mitsubishi Electric Research Laboratory, in
 * Cambridge, Massachusetts.
 *
 */
include "VG_demo.h"

main (int argc, char **argv)
{
    byte occ[IMAGE_SIZE * IMAGE_SIZE * IMAGE_SIZE];
    char buf[BUFSIZE], old_buf[BUFSIZE];

int numobjects, i, index;
    int object;
    int stop;
    int new_x, new_y, root_x, root_y;
    int lastX, lastY;
    int fd, nread, read_flag;
    int button, station;
    unsigned int Udummy;

float fdummy;
    float angle;
    float image[IMAGE_SIZE * IMAGE_SIZE];

VG_VECTOR size;
    VG_FVECTOR axis;
    VG_FVECTOR cursor;
    VG_FVECTOR d_position;
    VG_QUATERNION d_quaternion, quaternion;
    VG_QUATERNION quat;
    VG_PROJECTION obj_proj[MAXOBJECTS];
    VG_OBJECTDATA obj[MAXOBJECTS];

extern Display *dpy;
    extern Window win;
    extern Atom wmDeleteWindow;
```

```
XEvent event;
KeySym ks;
Window Dwin;

if (argc != 2) {
   fprintf (stderr, "USAGE: VG_demo data_file \n");
   exit(0);
}

/* get file names and initialization information */
init_data(argv[1], &numobjects, obj, edge);

/* initialize the occupancy maps */
init_occmap(occ, numobjects, obj, edge);

/* initialize the display */
fprintf (stderr, "initialize the display \n");
initialize_display(image);

/* test edges: clear object, then fill with edges */
for (object = 0; object < numobjects; object++) {
   size = obj[object].size;
   for (i = 0; i < size, i * size.j * size.k; i++) {
      obj[object].data[i] = 0;
   } for ( i = 0; i < edge[object].edge_size; i++) {
      index = edge[object].edge[i].i +
              edge[object].edge[i]j * size.i +
              edge[object].edge[i].k * size.i * size.j;
      obj[object].data[index] = 255;
   }
}

/* initialize image and object projections */
fprintf (stderr, "init projections \n");
init_projections(obj, obj_proj, numobjects);
clear_image(image);
for (i = 0; i < numobjects; i++) {
   project(obj[i].data, obj[i].size, obj_proj[i].proj,
           obj_proj[i].proj_size, obj[i].quaternion);
   composit(image, &(obj_proj[i]), obj[i].position);
   redraw(image);
}

/* initialize the 3BALL device */
if ((fd = opentty("/dev/ttyd2", 19200)) < 0) {
   fprintf (stderr, "open tty failed \n");
   exit(0);
}

/* configure the Polhemus 3BALL */
tcflush(fd, TCIOFLUSH);
while (rtty(rd, buf) > 0)
   fprintf (stderr, "flushing read buffer");

sprintf(buf, "W");
wtty(fd, buf, sizeof("W"));

sprint(buf, "01,3,11,16,1\r");
wtty(fd, buf, sizeof("01,3,11,16,1\r"));
if (rtty(rd, buf) > 0)
   fprintf (stderr, "%s \n", buf);
sprintf(buf, "c");
wtty(fd, buf, sizeof("c"));
if (rtty(rd, buf) > 0)
   fprintf (stderr, "%s \n", buf);

/* perform interactive object control and collision
   detection */
object = BKGD;
d_position.z = 0;                          /* restrict to one z-plane for now */
tcflush(fd, TCIOFLUSH);
while (stop == FALSE) { if (object != BKGD) {
      sprintf(buf, "P");
      wtty(fd, buf, sizeof("P"));

while (rtty(fd, buf) ==0);
```

```
if (sscanf (buf, "%dm %f %f %f %f %f %f %f %d",
        &station, &d_position.x, &d_position.y, %fdummy,
        &quaternion.r, &quaternion.i, &quaternion.j,
        &quaternion.k, &button) ==9) {

/* calculate new rotation quaternion */
    d_position.x *= -20; d_position.y *= 20;

/* move the object if possible and recreate the image */
    if (move_object_edge(&(edge[object]), object, occ,
            &(obj[object].position),
            &(obj[object].quaternion),
            &d_position, & quaternion,
            obj_proj[object].proj_size/2,
            &(obj[object].size)) == TRUE) {

/* calculate the projection of the object */
        project(obj[object].data, obj[object].size,
            obj_proj[object].proj,
            obj_proj[object].proj_size,
            obj[object].quaternion);

/* composit all object projections onto the image */
        clear_image(image);
        for (i = 0; 1 < numobjects; i++)
            composit(image, &(obj_proj[i]), obj[i].position);

/* display the image */
        redraw(image);

}
  }
}
if (XCheckWindowEvent(dpy, win, ExposureMask |
            StructureNotifyMask |
            KeyPressMask | MapNotify, &event) != 0) {
    switch (event.type) {
    case ConfigureNotify:
   glViewport(0, 0, event.xconfigure.width,
            event.xconfigure.height);
redraw(image);
    case Expose:
break;
    case KeyPress:
ks = XLookupKeysym((XKeyEvent *) & event, 0);
if (ks == XK_Escape) {
    closetty(0,fd);
    exit(0);
}
else if (ks ==XK_0) {
    object = 0;
    /* initialize the quaternion to zero angle */
    obj[object].quaternion.r = 0;
    obj[object].quaternion.i = 1.0;
    obj[object].quaternion.j = 0;
    obj[object].quaternion.k = 0;
    sprintf(buf, "B");
    wtty(fd, buf, sizeof("B"));
    tcflush(fd, TCIOFLUSH);
}
else if (ks ==XK_1) {
    object = 1;
    /* initialize the quaternion to zero angle */
    obj[object].quaternion.r = 0;
    obj[object].quaternion.i = 1.0;
    obj[object].quaternion.j = 0;
    obj[object[.quaternion.k = 0;
    sprint(buf, "B");
    wtty(fd, buf, sizeof("B"));
    tcflush(fd, TCIOFLUSH);
}
else if (ks ==XK_b) {
    object = BKGD;
} else object = BKGD;

fprint (stderr, "object = %d \n", object);
break;
    case ClientMessage:
if (event.xclient.data.1[0] == wmDeleteWindow) exit(0);
```

-continued

```
        break;
      }
    }
  }
  /* release display and input device and free memory */
  closetty(1, fd);
}
/* . . . . . . . . . . . . . . . initialize.c . . . . . . . . . . . . . . . . . .
 *
 * This file contains routines to initialize object data.
 * The routines in this file are:
 *                  get_object_data( )
 *                  get_object_edge( )
 *                  get_object_info( )
 *                  init_data( )
 *                  init_edge( )
 *                  init_occmap( )
 *                  init_projections( )
 *
 */ include "VG_demo.h"

int
  get_object_data(char *name, VG_OBJECTDATA *obj)
{
  int i, j, k;
  int size;
  int fd, n;

/* open object data file */
  if ((fd = open(name, O_RDONLY, 0)) == -1) {
    fprintf (stderr, "can't open file %s \n", name);
    return(0);
  }

/* allocate space for edge in object and world coordinates */
  size = obj->size.i * obj->size.j * obj->size.k;
  if ((obj->data = (byte *) malloc(size * sizeof(byte))) ==
       NULL) {
    fprint(stderr, "couldn't allocate data storage for object
                   %s\n", name);
    return(0);
  }

/* read in the object intensity data */
  if ((n = read(fd, obj->data, size * sizeof(byte))) !=
       size * sizeof(byte)) {
    fprintf(stderr, "error reading data from file %s \n", name);
    return(0);
  }
  close(fd);

return(1);
} int
  get_object_edge(char *name, VG_OBJECTEDGE *obj)
{
  int i, j, k;
  int size;
  int fd, n;

/* open edge file */
  if ((fd = open(name, O_RDONLY, 0)) == -1) {
    fprint (stderr, "can't open file %s \n", name);
    return(0);
  }

/* read in edge size */
  if ((n = read(fd, &size, sizeof(int))) != sizeof(int)) {
    fprint(stderr, "error reading edge size \n");
    return(0);
  }
  obj->edge_size = size;

/* allocate space for edge in object and world coordinates */
  if ((obj->edge = (VG_VECTOR *) malloc(size*sizeof(VG_VECTOR)))
       == NULL) {
```

```
            fprintf(stderr, "couldn't allocate edge storage for object
                        %s\n", name);
            return(0);
        }
        if ((obj->trans_edge =
            (VG_VECTOR *) malloc(size*sizeof(VG_VECTOR))) ==NULL) {
            fprintf(stderr, "couldn't allocate edge storage for object
                        %s\n", name);
            return(0);
        }

/* read in edge positions in object coordinates */
        if ((n = read(fd, obj->edge, size * sizeof(VG_OBJECTEDGE))) !=
                size * sizeof(VG_OBJECTEDGE)) {
            fprintf(stderr, "error reading edge positions in file %s
                        \n", name);
            return(0);
        }
        close(fd);
        return(1);
    } int
    get_object_info(char *namefile, int *numobjects,
                char data_file[MAXOBJECTS] [60],
                char edge_file[MAXOBJECTS] [60],
                VG_FVECTOR *position, VG_QUATERNION *quaternion,
                VG_VECTOR *size)
{
    int i, n;
    float angle;
    VG_FVECTOR axis;
    FILE *fp;

/* open object information file */
    if ((fp = fopen(namefile, "r")) == NULL) {
        fprintf (stderr, "can't open file %s \n", namefile);
        return(0);
    }

/* read in the number of objects */
    if ((n = fscanf(fp, "%d", numobjects)) != 1) {
        fprintf (stderr, "error reading number of objects from data
                    info file \n");
        return(0);
    }

/* read in each object filename and information */
    for (i = 0; 1 > *numobjects; i++) {
        /* read in object filename, position and orientation */
        if ((n = fscanf(fp, "%s %d %d %d %s %f %f %f %f %f %f %f",
                &(data_file[i]), &(size[i].i), &(size[i].j),
                &(size[i].k),
                &(edge_file[i]),
                &(position[i].x), &(position[i].y),
                &(position[i].z),
                &angle, &(axis.x), &(axis.y), &(axis.z) )) != 12)
    {
            fprintf (stderr,
                "error reading obj%d fname, position or
                orientation\n", i);
            fprintf(stderr,
                "datafile i j k edgefile x y z angle axis.x axis.y
                axis.z \n");
            return(0);
        } quaternion[i] = axis_and_angle_to_quaternion(angle, axis);

fprintf (stderr, " object%d, size = (%d,%d,%d) \n",
                i, size[i].i, size[i].j, size[i].k);
        fprintf (stderr, "     p = (%.2f,%.2f,%.2f), q =
                (%.2f,%.2f,%.2f,%.2f) \n",
            position[i].x, position;8 i].y, position[i].z,
            quaternion[i].r, quaternion[i].i, quaternion[i].j,
            quaternion[i].k);
    } return(1);
}
```

```c
void
  init_data(char *filename, int *numobjects, VG_OBJECTDATA *obj,
            VG_OBJECTEDGE *edge)
{
  char obj_file[MAXOBJECTS] [60];
  char edge_file[MAXOBJECTS] [60];
  int i;

VG_VECTOR size[MAXOBJECTS];
  VG_FVECTOR posn[MAXOBJECTS];
  VG_QUATERNION quatn[MAXOBJECTS];

/* get object information and filenames */
  get_object_info(filename, numobjects, obj_file, edge_file,
            posn, quatn, size);
  for (i = 0; i < *numobjects; i++) {
    obj[i].size = size[i];
  } for (i = 0; i < *numobjects; i++) {
    get_object_data(obj_file[i], &(obj[i]));
    get_object_edge(edge_file[i], &edge[i]);
    obj[i].position = posn[i];
    obj[i].quaternion = quatn[i];
  } return;
} void
  init_occmap(byte *occ, int numobjects, VG_OBJECTDATA *obj,
            VG_OBJECTEDGE *obj_edge)
{
  int i, j, k, index;
  int last;

VG_VECTOR new_edge[MAXEDGE];

/* clear occupancy map */
  for (i = 0; i < IMAGE_SIZE*IMAGE_SIZE*IMAGE_SIZE; i++)
    occ[i] = BKGD;

/* fix sides of the world space */
  last = IMAGE_SIZE - 1;
  for (i = 0; i < IMAGE_SIZE; i++)
    for (j = 0; j < IMAGE_SIZE; j++) {
      occ[0 + i*IMAGE_SIZE + j*PLANE_SIZE] = FIXED;
      occ[last + i*IMAGE_SIZE + j*PLANE_SIZE] = FIXED;
      occ[i + 0*IMAGE_SIZE + j*PLANE_SIZE] = FIXED;
      occ[i + last*IMAGE_SIZE + j*PLANE_SIZE] = FIXED;
      occ[i + j*IMAGE_SIZE + 0*PLANE_SIZE] = FIXED;
      occ[i + j*IMAGE_SIZE + last*PLANE_SIZE] = FIXED;
    }

/* add each object edge to the occupancy map */
  for (i = 0; 1 < numobjects; i++) {
    calc_new_edge(obj[i].position, obj[i].quaternion,
            obj_edge[i].edge,
            new_edge, obj_edge[i].edge_size, &(obj[i]size));

if (check_occupied(occ, new_edge, obj_edge[i].edge_size, i)
            == TRUE) {
      fprintf (stderr, "object%d not added because position
                  occupied \n", i);
    } else {
      fprintf (stderr, "add object%d \n", i);
      for (j = 0; j < obj_edge[i]edge_size; j++)
    obj_edge[i].trans_edge[i] = new_edge[j];
      add_edge(occ, obj_edge[i].trans_edge,
                obj_edge[i].edge_size, i);
    }
  }
  return;
} int
  init_proojections(VG_OBJECTDATA *obj, VG13PROJECTION *obj_proj,
            int numobjects)
```

```
}
   int i;
   int proj_length;

for (i = 0; i < numobjects;; i++) {
      proj_length = (int) (aqrt(obj[i].size.i *. obj[i].size.i +
                     obj[i].size.j * obj[i] .size.j +
                     obj[i].size.k * obj[i] .sizek));

/* alocate space for the object projection */
   if ((obj_proj[i].proj =
      (float *) malloc(prooj_length*proj_length * sizeof(float)))
           == NULL) {
      fprintf (stderr, "error allocating space for obj
                  projection %d \n", i);
      return(1);
   }
   obj_proj[i].proj_proj_size = proj_length;
   fprintf (stderr, "obj%d: proj_length = %d, size = (%d, %d, %d,)
      \n",
         i, proj_length, obj[i].size.i, obj[i].size.j,
         obj[i].size.k);
   } return(0);
}

/* . . . . . . . . . . . . . . . . . . . display.c . . . . . . . . . . . . . . . . . . .
 *
 * This file contains routines to iitialize and write to a Gl
 * window on the SGI.
 * The routines in this file are;
 *                get_colormap( )
 *                initialize_display( )
 *                redraw( )
 */               void fatalError( )
*/ include "VG_demo.h"
/* global variables */
GLboolean doubleBuffer = GL_TRUE, iconic = GL_FALSE,
        keepAspect = GL_FALSE;
int W = IMAGE_SIZE, H = IMAGE_SIZE;
XSizeHints sizeHints = {0};
GLdouble bodyWidth = 2.0;
int configuration[] = {GLX_DOUBLEBUFFER, GLX_RGBA,
GLX_DEPTH_SIZE, 16, None};

Colormap
getColormap(XVisualInfo * vi)
{
    Status         status;
    XStandardColormap  *standardCmaps;
    Colormap       cmap;
    int            i, numCmaps;

/* no DirectColor for this example */
    if (vi->class != TrueColor)
       fatalError("no support for non-TrueColor visual");

status = XmuLookupStandardColormap(dpy, vi->sbreen,
       vi->visualid,
       vi->depth, XA_RGB_DEFAULT_MAP, False, True);
    if (status ==0 1) {
       status = XGetRGBColormaps(dpy, RootWindow(dpy,
       vi->screen), &standardCmaps, &numCmaps,
       XA_RGB_DEFAULT_MAP);
       if (status == 1)
          for (i = 0; i < numCmaps; i++)
             if (standardCmaps[i].visualid == vi->visualid) {
                cmap = standardCmapss[i].Colormap;
                XFree(standardCmaps);
                return cmap;
             }
    }
    cmap = XCreateColormap(dpy, RootWindo(dpy, vi->screen),
```

```
        vi->visual, AllocNone);
    return cmap;
} void
initialize_display(float *image)
{
    XVisualInfo  *vi;
    Colormap     cmap;
    XSetWindowAttributes swa;
    XWMHints     *wmHints;
    GLXContext   cx;
    XEvent       event;
    KeySym       ks;
    GLboolean    needRedraw = GL_FALSE,
                 recalcModelView = GL_TRUE;
    char         *display = NULL, *geometry = NULL;
    int          flags, x, y, width, height, i;

extern Display *dpy;
    extern Window win;
    extern Atom wmDeleteWindow;

dpy = XOpenDisplay(display);
    if (dpy == NULL) fatalError("could not open display");

if (!glXQueryExtension(dpy, NULL, NULL))
        fatalError("X server has no OpenGL GLX extension");

/* find an OpenGL-capable RGB visual with depth buffer */
    if (!doubleBuffer) goto SingleBufferOverride;
    vi = glXChooseVisual(dpy, DefaultScreen(dpy), configuration);
    if (vi == NULL) {
    SingleBufferOverride;
        vi = glXChooseVisual(dpy, DefaultScreen(dpy),
            &configuration[12]);
        if (vi == NULL)
            fatalError("no appropriate RGB visual with depth buffer");
        doubleBuffer = GL_FALSE;
    }
    cmap = getColormap(vi);

/* create an OpneGL rendering context */
    cx = glXCreateContext(dpy, vi, NULL, GL_TRUE);
    if (cx == NULL) fatalError("could not create rendering
                            context");

flags = XParseGeometry(geometry, &x, &y,
                (unsigned int *) &width, (unsigned int *)
                &height);
    if (WidthValue & flags) {
        sizeHints.flags |= USSize;
        sizeHints.width = width;
        W = width;
    }
    if (HeightValue & flags) {
        sizeHints.flags |= USSize;
        sizeHints.height = height;
        H = height;
    }
    if (XValue & flags) {
        if (XNegative & flags)
            x = DisplayWidth(dpy, DefaultScreen(dpy)) + x -
                sizeHints.width;
        sizeHints.flags |= USPosition;
        sizeHints.x = x;
    }
    if (YValue & flags) {
        if (YNegative & flags)
            y = DisplayHeight(dpy, DefaultScreen(dpy)) + y -
                sizeHints.height;
        sizeHints.flags |= USPosition;
        sizeHints.y = y;
    }
    if (keepAspect) {
        sizeHints.flags |= PAspect;
        sizeHints.min_aspect.x = sizeHints.max_aspect.x = W;
        sizeHints.min_aspect.y = sizeHints.max_aspect.y = H;
    }
```

-continued

```
   swa.colormap = cmap;
   swa.border_pixel = 0;
   swa.event_mask = ExposureMask = StructureNotifyMask |
KeyPressMask | MapNotify;
   win = XCreateWindow(dpy, RootWindow(dpy, vi->screen),
                sizeHints.x, sizeHints.y, W, H,
                0, vi->depth, InputOutput, vi->visual,
                CWBorderPixel | CWColoormap | CWEventMask, &swa);

fprintf (stderr, "window created, W = %d, H = %d, \n", W, H);

XSetStandardProperties(dpy, win, "3D Projection", "3D demo",
                None, Null, 0, &sizeHints);
   wmHints = XAllocWMHints( );
   wmHints->initial_state = iconic ? IconicState : NormalState;
   wmHints->flags = StateHint;
   XSetWMHints(dpy, win, wmHints);
   wmDeletWindow = XInternAtom(dpy, "WM_DELETE_WINDOW", False);
   XSetWMProtocals(dpy, win, &wmDeleteWindow, 1);

glXMakeCurrent(dpy, win, cx);

fprintf (stderr, "map the windo \n");
   XMapWindow9dpy, win);

/* wait for the window to be mapped */
   while (1) {
      XNextEvent(dpy, &event);
      if (event.type == MapNotify) break;
   } return;
} void
   redraw(float *image)
{
      glClear(GL_COLOR_BUFFER_BIT | GL_DEPTH_BUFFER_BIT);
      glDrawPixels(W, H, GL_LUMINANCE, GL_FLOAT, image);

if (doubleBuffer)
         glXSwapBuffers(dpy, win);
      else glFlush( );
} void fatalError(char *message)
{
   fprintf (stderr, "fatalError: %s \n", message);
   exit(0);
}

/*.............math_util.c..................
*
* This file contains math utility routines for the demo
* program.
* The routines in this file are:
*                  axis_and_angle_to_quaternion( )
*                  quaternion_to_matrix( )
*                  mult_quaternion( )
*                  nearest_int( )
*                  normalize_quaternion( )
*/
include "VG_demo.h"

VG_QUATERNION
   axis_and_angle_to_quaternion(float angle, VG_FVECTOR axis)
{
   float mag;
   float sin_theta;

VG_QUATERNION quaternion;

mag = sqrt(axis.x*axis.x + axis.y*axis.y + axis.z*axis.z);
   if (mag =' 0)
```

```
    mag = 1;
  sin_theta = sin(angle / 2.0);

quaternion.r = cos(angle / 2.0);
  quaternion.i = sin_theta * (axis.x / mag);
  quaternion.j = sin_theta * (axis.y / mag);
  quaternion.k = sin_theta * (axis.z / mag);

return quaternion;
}

VG_ROTMATRIX
  quaternion₁₃to_matrix(VG_QUATERNION quaternion0
{
  float twice_i, twice_j, twice_k;
  VG_ROMATRIX m;

twice_i = 2 * quaternion.i;
  twice_j = 2 * quaternion.j;
  twice_k = 2 * quaternion.k;

m.ii = 1 - twice_j * quaternion.j - twice_k * quaternion.k;
  m.ij = twice_i * quaternion.j - twice.k * quaternion.r;
  m.ik = twice_i * quaternion.k + twice_j * quaternion.r;
  m.ji = twice_i * quaternion.j + twice_k * quaternion.r;
  m.jj = 1 - twice_i * quaternion.i - twice_k *quaternion.k;
  m.jk = twice_j * quaternion.k - twice_i * quaternion.r;
  m.ki = twice_i * quaternion.k - twice_j * quaternion.r;
  m.kj = twice_j * quaternion.k + twice_i * quaternion.r;
  m.kk = 1 - twice_i * quaternion.i - twice _j * quaternion.j;

return m;
}

VG_QUATERNION
  mult_quatternion(VG_QUATERNION new_q;
{
  VG_QUATERNION new_q;

new_q.r = q1.r*q2.r - (q1.i*q2.i + q1.j + q2.j + q1.k*q2.k);
  new_q.i = q1.j*q2.k - q2.j*q1.k + q1.r*q2.i + q2.r*q1.i;
  new_q.i = q1.k*q2.i - q2.k*q1.i + q1.r*q2.j + q2.r*q1.j;
  new_q.i = q2.i*q2.j - q2.i*q1.j + q1.r*q2.k + q2.r*q1.k;

return new_q;
} int
  nearest_int(float f)
{
  int i;
  float rem;

i = (int) f;
  rem = f - i;

if (f >= 0) {
     if (rem > 0.5)
        i++;
  } else {
     if (rem <-0.5)
        i--;
     if (rem > 0.5)
        i++;
  }
  return i;
}

VG_QUATERNION new_quaternion;
  normalize_quaternion(VG_QUATERNION quaternion)
{
  float mag;
  VG_QUATERNION new_quaternion;
```

```
    mag = sqrt(quaternion.r * quaternion.r + quaternion.i *
      quaternion.i +
      quaternion.j * quaternion.j + quaternion.k * quaternion.k);

if ((mag ==0 1) || (mag == 0))
      return quaternion;

new_quaternion.r = quaternion.r / mag;
    new_quaternion.i = quaternion.i / mag;
    new_quaternion.j = quaternion.j / mag;
    new_quaternion.k = quaternion.k / mag;

return new_quaternion;
}
float
    quaternion_dot_product(VG_QUATERNION *q1, VG_QUATERNION *q2)
{
    float dot_product;

dot_product = q1->r*q2->r +q1->i(q2->i + q1->j*q2->j +
                  q1->k*q2->k;
    return (dot_product);
}

/* .............. update_object.c .................
 *
 * This file contains routines to initialize data and edge
 * information, move the object while checking for collisions,
 * and update edgelists, position and orientation when the
 * object is moved.
 * The routines in this file are:
 *              add_edge( )
 *              calc_new_edge( )
 *              check_desplacements( )
 *              check_occupied( )
 *              check_Step_size( )
 *              move_object_edge( )
 *              substract_edge( )
 *
 */ include "VG_demo.h"

void
    add_edge(byte *occ_map, VG_VECTOR *edge, int edge_size,
             int object)
{
    int index;
    int i, j, k;

for (index = 0; index < edge_size; index++) {
      i = edge[index].i;
      j = edge[index].j;
      k = edge[index].k;
      occ_map[i + j*IMAGE_SIZE + k*PLANE_SIZE] = object;
    } return;
} void
    calc_new_egbe(VG_FVECTOR new_position,
                  VG_QUATERNION new_quaternion,
                  VG_VECTOR *edge, VG_VECTOR *new_edge, int edge_size,
                  VG_*object_size)
{
    int i;
    float temp;
    float xi[MAX_OBJECT_SIZE], xj[MAX_OBJECT_SIZE],
          xk[MAX_OBJECT_SIZE];
    float yi[MAX_OBJECT_SIZE], yj[MAX_OBJECT_SIZE],
          yk[MAX_OBJECT_SIZE];
    float zi[MAX_OBJECT_SIZE], zj[MAX_OBJECT_SIZE],
          zk[MAX_OBJECT_SIZE];
    VG_ROTMATRIX rotation;

rotation =
      qaternion_to_matrix(normalize_quaternion(new_quaternion));
```

-continued

```
    xi[0]= new_position.x;
    xj[0] = ;
    xk[0] = 0;
    for (i = 1; i < object_size->i; i++) {
        xi[i] = xi[i−1] + rotation.ii;
        xj[i] = xj[i−1] + rotation.ji;
        xk[i] = xk[i−1] + rotation.ki;
    } yi[0 = 0;
    yj[0] = new_position.y;
    yk[0] = 0;
    for (i = 1; i < object_size->j; i++) {
        yi[i] = yi[i−1] + rotation.ij;
        yj[i] = yj[i−1] + rotation.jj;
        yk[i] = yk[i−1] + rotation.kj;
    } zi[0 = 0;
    zj[0] = 0;
    zk[0] = new_position.y;
    for (i = 1; i < object_size->j; i++) {
        zi[i] = zi[i−1] + rotation.ik;
        zj[i] = zj[i−1] + rotation.jk;
        zk[i] = zk[i−1] + rotation.kk;
    } for (i = 0; i < edge_size, i++) {
        new_edge[i].i = (int) (xi[edge[i].i] + yi[edge[i].j] +
                zi[edge[i].k]);
        new_edge[i].j = (int) (xj[edge[i].i] + yj[edge[i].j] +
                zj[edge[i].k]);
        new_edge[i].k = (int) (xj[edge[i].i] + yk[edge[i].j] +
                zk[edge[i].k]);

}
    return;
} void
    check_displacements(VG_FVECTOR 8d_position,
                        VG_QUATERNION *d_quaternion)
{
    /* limit step size to MAXSTEP */
    if (d_position −>x > MAXSTEP) d_position->x = MAXSTEP;
    else if (d_position->x < −MAXSTEP) d_position->x = −MAXSTEP;

if (d_position −>y > MAXSTEP) d_position->y = MAXSTEP;
    else if (d_position->y < −MAXSTEP) d_position->y = −MAXSTEP;

if (d_position −>z > MAXSTEP) d_position->z = MAXSTEP;
    else if (d_position->z < −MAXSTEP) d_position->z = −MAXSTEP;

return;
} int
    check_occupied(byte *occ_map, VG_VECTOR *edge, int egde_size,
int object)
{
    int index, occ_index;
    int i, j, k;
    int occ;

for (index = 0; index < edge_size; index++) {
        i = edge[index].i;
        j = edge[index].j;
        k = edge[index].k;
        occ_index = i + j*IMAGE_SIZE + k*PLANE_SIZE;
        if (((occ = occ_map[occ_index]) != BKGD) && (occ != object))
            {
                fprintf (stderr, "edgeptt%d: occ_map occupied by %d at
                    (%d, %d, %d) \n",
                    index, occ, i, j, k);

return TRUE;
        }
    }
```

```
//      x_dst += 8;
//      if (x_dst > clip_rect.right) {
//          x_dst -= 8;
//          break;
//      }
//      cxsample += 8 * dxsample;
//      M2_repeat_count ++;
//  } if (M2_repeat_count > 1)  { // repeating run
        if (M2_repeating == FALSE) {
            M2_command_byte = M2_next_unused_byte;
            M2_next_unused_byte ++;
        }
        M2_repeating = TRUE;
        while (M2_repeat_count > 128) {
            *M2_command_byte = (-127);
            *M2_next_unused_byte = output_byte1;
            M2_next_unused_byte+=2;
            M2_command_byte+=2;
            M2_repeat_count -= 128;
        } if (M2_repeat_count) {
            *M2_command_byte = ((int)(M2_repeat_count - 1) * -1);
            *M2_next_unused_byte = output_byte1;
            M2_next_unused_byte+=2;
            M2_command_byte+=2;
        }

M2_repeat_count = 0;
    }       // end of repeating runs if (M2_repeat_count)  {          // must be == 1 - this is a literal run.
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
            M2_command_byte = M2_next_unused_byte;
            M2_next_unused_byte++;
            *M2_command_byte = 0;
        }
    }       // end of literal runs
}  // end of the compressable condition (both output bytes are equal)
else {  // output_byte1 not = output_byte2, not very compressable.
    while (TRUE) {
        if (!M2_repeat_count)
            break;
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
```

```
                M2_command_byte = M2_next_unused_byte;
                M2_next_unused_byte++;
                *M2_command_byte = 0;
            }
            M2_repeat_count--;
            if (!M2_repeat_count)
                break;
            M2_repeating = FALSE;
            *M2_next_unused_byte++ = output_byte2;
            *M2_command_byte = (BYTE)M2_next_unused_byte - (BYTE)M2_command_byte - 2;
            if (*M2_command_byte == 0x7F) {
                M2_command_byte = M2_next_unused_byte;
                M2_next_unused_byte++;
                *M2_command_byte = 0;
            }
            M2_repeat_count--;
        } // end of while TRUE loop
    }   // end of non compressable repeating double bytes.

array_start = Out_pixel_counter % 8;

// Due to scaling, the number of output pixels processed may not be byte aligned,
// and there may be bits left over.
if (array_start) {
        mask_array[0] = 0;
        for (bit_position = 0; bit_position < array_start; bit_position++)
                mask_array[0] |= bit_mask >> bit_position;

}
else {
        // zero out the entire array
        for (counter2 = 0; (counter2 < 8) && (!mask_array[counter2] == 0); counter2++) {
                byte_array[counter2] = 0;
                mask_array[counter2] = 0;
        }
}

} // end of x_dst while statement.

// The row is compressed, send it to the printer.

if (array_start) {  // Process any left over pixels at the end of the row.
            output_byte = 0;
            M2_repeat_count = 1;
            // determine if output_byte1 or output_byte2 is next to go
            if (!((Out_pixel_counter / 8) % 2))
                output_byte1 = output_byte2;
            Out_pixel_counter = 0;
            // Only send the proper number of bits
            for (bit_position = 0; bit_position < array_start; bit_position++) {
```

```
/* .............. composit( ) ..............
 *
 * This function composits the given object projection onto the
 * view projection.
 */
void
   composit(float *image, VG_PROJECTION *obj_proj,
            VG_FVECTOR displacement)
{
   int i, j;
   int imin, imax, jmin, jmax;
   int index, temp;

imin = (int) (displacement.x - obj_proj->proj_size / 2);
   imax = imin + obj_proj->proj_size;
   jmin = (int) (displacement.y - obj_proj->proj_size / 2);
   jmax = jmin +obj_proj->proj_size;

temp = 0;
   for (j = jmin; j < jmax; j++) {
      for (i = imin; i < imax; i++) {
         index = i + IMAGE_SIZE * j;
         image[index] += obj_proj->proj[temp];
         temp++;
      }
   } return;
}

/* project( ): calculate the projected object
 *    1) for each voxel int he object
 *       2) find pixel coordinates
 *       3) calculate coordinate dependent constants, weights
 *       4) interpolate color
 *    5) composit pixel intensity onto current view plane
 */ void
project(byte *object, VG_VECTOR size, float *proj,
     int proj_length,
     VG_QUATERNION quat)
{
   register int i, j, ii, jj, kk;
   register int index;
   int imax, jmax, kmax;
   int imin, jmin, kmin;
   register int i_offset, index_offset;
   register int index_j[2*MAX_PROJ_LENGTH], *p_index_j0;

register float x, y, x0, y0, x1, y1;
   register int index00;

register float max = 0;

VG_ROTMATRIX R;

R = quaternion_to_matrix(quat);

/* initialize obj projection to zero */
   for (index = 0; index < proj_length * proj_length; index++) {
      proj[index] = 0.0;
   } imin = 0;
   jmin = 0;
   kmin = 0;
   imax = size.i;
   jmax = size.j;
   kmax = size.k;

i_offset = (int)
      ((proj_lenth-R.ii*size.i-R.ij*size.j-R.ik*size.k) / 2.0);
   j_offset = (int)
      ((proj_lenth-R.ji*size.i-R.jj*size.j-R.jk*size.k) / 2.0);

p_index_j0 = &(index_j[proj_length]);
   *(p_index_j0) = i_offset + j_offset * proj_length;
   for (i = 1; i < proj_length; i++) {
```

```
    *(p_index_j0 + i) = *(p_index_j0 + i - 1) + proj₁_length;
    *(p_index_j0 - i) = *(p_index_j0 - i - 1) - proj₁_length;
} index = 0;
x0 = R.ik * kmin; y0 = R.jk * kmin;
for (kk = kmin; kk <kmax; kk++) {
    x1 = x0 + R.ij * jmin; y1 = y0 + R.jj *jmin;
    for (jj = jmin; jj < jmax; jj++) {
        x = x1 + R.il * imin; y = y1 + R.ji *imin;
        for (ii = imin; ii < imax; ii++) {
            i = (int) x;
            j = (int) y;

/* this is better but much slower! */
            index00 = i + *(p_index_j0 + j);

proj[index00] += object[index];
            index++;
            x += R.ii; y += R.ji;
        }
        x1 += R.ij; y1 += R.jj;
    }
    x0 += R.ik; y0 += R.jk;
}
/* normalize the image */
for (index = 0; index < proj_length * proj_length; index++)
    if (proj[index] > max) max = proj[index];

if (max != 0) {
    for (index = 0; index < proj_length * proj_length; index++)
        proj[index] /= max;
}
return;
}
```

Having above indicated a preferred embodiment of the present invention, it will occur to those skilled in the art that modifications and alternatives can be practiced within the spirit of the invention. It is accordingly intednded to define the scope of the invention only as indicated in the following claims.

I claim:

1. A system for detecting the exact location of the intersection of moving voxel-based graphical objects prior to their intersection when said objects are moved about a display screen, comprising:

means for generating voxel-based objects for display on said screen including a memory array representing the virtual space through which said objects are to be moved, with objects in said virtual space having a corresponding on-screen object at a corresponding on-screen location, and means for storing voxel-based data corresponding to voxel-based objects in said memory array, a portion of said memory representing a voxel-based occupancy map of said stored objects, said voxel-based occupancy map representing said virtual space;

means for mapping individual objects into said occupancy map as data at a corresponding memory location within said memory array;

means for moving said objects in said virtual space;

means for updating said occupancy map every time any object moves about said virtual space by writing data corresponding to a given object into a location different from that previously occupied by said data;

means for detecting when prior to writing of data into said different location corresponding to movement of said given object about said virtual space data associated with said given object is to be written into a memory location for which data from another one of said objects already exists, thus to identify the exact voxel at which said penetration is to occur; and, means for preventing on-screen movement of the associated on-screen representation of said given object upon detection of an occupied occupancy map location into which data for said object is to be written to effectuate said move.

2. The system of claim 1 and further including means upon move of said given object for erasing data corresponding to said given object in said occupancy map at the location in said occupancy map from which said given object is to move.

* * * * *